United States Patent
Britt et al.

(10) Patent No.: US 9,292,309 B2
(45) Date of Patent: *Mar. 22, 2016

(54) ABSTRACTED DISPLAY BUILDING METHOD AND SYSTEM

(75) Inventors: Clinton Duane Britt, Milwaukee, WI (US); Joseph Francis Mann, Waukesha, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 1001 days.

This patent is subject to a terminal disclaimer.

(21) Appl. No.: 13/430,303

(22) Filed: Mar. 26, 2012

(65) Prior Publication Data

US 2012/0240049 A1    Sep. 20, 2012

Related U.S. Application Data

(63) Continuation of application No. 11/147,604, filed on Jun. 7, 2005, now Pat. No. 8,151,196.

(51) Int. Cl.
*G06F 3/048*      (2013.01)
*G06F 9/44*       (2006.01)
*H04L 29/08*      (2006.01)
*H04L 12/24*      (2006.01)

(52) U.S. Cl.
CPC .......... *G06F 9/4443* (2013.01); *H04L 29/0899* (2013.01); *H04L 41/12* (2013.01); *H04L 41/22* (2013.01)

(58) Field of Classification Search
CPC ...... H04L 41/22; H04L 41/12; H04L 29/0899
USPC ......................................................... 715/735
See application file for complete search history.

(56) References Cited

U.S. PATENT DOCUMENTS

| | | | |
|---|---|---|---|
| 6,305,009 B1 * | 10/2001 | Goor | 717/116 |
| 6,725,032 B1 | 4/2004 | Sheridan et al. | |
| 7,702,409 B2 * | 4/2010 | Lucas | G05B 19/0426 700/18 |
| 7,721,019 B2 * | 5/2010 | Pierce et al. | 710/30 |
| 7,729,789 B2 * | 6/2010 | Blevins et al. | 700/83 |
| 7,747,596 B2 * | 6/2010 | Bigioi | H04L 12/2803 707/705 |
| 8,898,123 B2 * | 11/2014 | Britt | G06F 9/4443 707/697 |
| 8,990,768 B2 * | 3/2015 | Kowal | G06F 9/4443 717/109 |
| 2001/0037489 A1 * | 11/2001 | Stripf et al. | 717/1 |
| 2002/0030843 A1 | 3/2002 | Tuli | |
| 2002/0055790 A1 | 5/2002 | Havekost | |
| 2004/0021679 A1 | 2/2004 | Chapman et al. | |
| 2005/0027841 A1 | 2/2005 | Rolfe | |
| 2006/0221380 A1 | 10/2006 | Pretz et al. | |
| 2015/0045918 A1 * | 2/2015 | Mann et al. | 700/87 |

FOREIGN PATENT DOCUMENTS

WO   2004086160 A1   10/2004

* cited by examiner

*Primary Examiner* — David Phantana Angkool
(74) *Attorney, Agent, or Firm* — Fletcher Yoder P.C.

(57) ABSTRACT

A technique is provided for configuring and interface device. The interface device includes a plurality of device elements, each having visual representation and a state engine defining a functionality. A server module in the interface device receives a query from a user viewable screen that includes the visual representations. The server module serves the user viewable screen to a general purpose viewer or browser, which may include a design-time environment. An access module, then, prompts each device to send an image defining its visual representation to a memory display context for inclusion in the user viewable screen. The access module works without reference to the respective functionality of the device elements.

24 Claims, 19 Drawing Sheets

ABSTRACTED DISPLAY BUILDING METHOD AND SYSTEM

CROSS-REFERENCE TO RELATED APPLICATIONS

This application is a continuation of application Ser. No. 11/147,604, filed Jun. 7, 2005, entitled "Abstracted Display Building Method and System" in the name of Clinton Duane Britt et al.

BACKGROUND

The present invention relates generally to the field of interface devices such as for interfacing with machines or in a stand-alone manner. More particularly, the invention relates to a technique for extracting data stored on an interface device and, where desired, changing or reconfiguring the data so as to change visual views, functionalities and so forth of software device elements stored on the device.

A wide range of interface devices are known and are presently in use in many different fields. In industrial automation, for example, human machine interfaces or "HMIs" are commonly employed for monitoring or controlling various processes. The HMIs may read from or write to specific registers such that they can reflect the operating state of various machines, sensors, processes, and so forth. The interfaces can also write to registers and memories such that they can, to some extent, control the functions of the process. In monitoring functions alone, little or no actual control is executed. In many other settings similar devices are employed, such as in automobiles, aircraft, commercial settings, and a host of other applications. In many applications, the interface may not communicate with a remote device or process, but may be operated in a stand-alone manner.

With the advent of object-oriented programming, strides have been made in improving interface devices and similar hardware. Such strides include programming of individual software objects or device elements which can interact to carryout complex functions. However, further improvement of the systems is needed. In particular, there is needed an improved technique for interacting with an interface that includes device elements. Most prior art approaches relied upon executing the device elements by transmitting the objects themselves for execution. However, such techniques lead to the need to understand and anticipate structures of the underlying device elements and their interactions. There is a need in the art for an improved technique that will permit a more abstracted configuration of device elements in interfaces and that will be applicable to a range of device elements and structures independently.

BRIEF DESCRIPTION

The present invention provides a novel approach to interface configuration and programming design to respond to such needs. The technique makes use of device elements, such as elements that may include functionalities and visual representations that may be presented in a design-time environment. The functionalities are generally defined by a state engine of each device element. A server module in the interface device receives a query from a user viewable screen in a general purpose browser or viewer. The screen includes the visual representations corresponding to the device elements. An access module, then, is configured to prompt each device element to send an image defining its visual representation to a memory display context. A memory display context is used to generate the user viewable screen that the server module provides to the viewer.

The server module may include an HTTP server resident on the interface device. Moreover, the images may be provided in any suitable form, such as in accordance with JPEG standards. In certain embodiments, the display includes HTML tags, and the images may be converter to dynamic content and served as dynamic HTML page.

The invention also provides for an interface device that has a design-time environment that includes static content and dynamic content. The dynamic content is determined by an access module that, as before, acquires visual representations from device elements placed in a memory display context. The server module receives a query from a user viewable screen and is configured to send a design-time environment for viewing in a general purpose viewer in response to the query.

The access module and the software that determines the visual representation to be used in the user viewable screens operate without reference to the respective functionality of the device elements. That is, the access module and related devices used to serve the screen, and any design-time environment, does not require any prior knowledge of the nature, function, properties or interrelationships between and among the device elements. Thus, the same modules and design-time environment may be used for any pre-established or configurable device elements with any relationships between the elements, and similar configuration may be performed without any prior knowledge of such programming.

Methods and computer programs for carrying out similar functionality to that set forth above are also provided.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention relate generally to the field of configurable interfaces. In the present context, a "configurable interface" is any human interface device having embedded and dedicated code for accessing settings and displaying user-viewable views or screens based upon such settings. For example, such configurable interfaces may be used as operator interfaces for industrial equipment. More particularly, embodiments of the present invention relate to techniques for operation of configurable interfaces, and for accessing, configuring, and creating applications for utilization with such configurable interfaces by serving configuration screens to a browser or similar general purpose viewer.

An interface generally may read data from and write to remote memory and particular registers, such as for interfacing with a process or machine. In other contexts, the interface simply accesses and displays data in a stand-alone architecture. For example, the innovations described below may be implemented in industrial computer terminals, equipment interfaces (e.g., programmable logic controllers and software interfaces), and related devices such as those used in industrial and commercial settings. When used to interface with a controller, machine or process, the interfaces are sometimes referred to as human-machine interfaces (HMIs), man-machine interfaces (MMI), graphical user interfaces (GUI), user interfaces (UI), operator interfaces (OI), and so forth. The term HMI is generally used in the present discussion. However, as described below, the inventive concepts presented herein are not limited to interfaces linked to external components and systems.

System Overview

Figure 1:
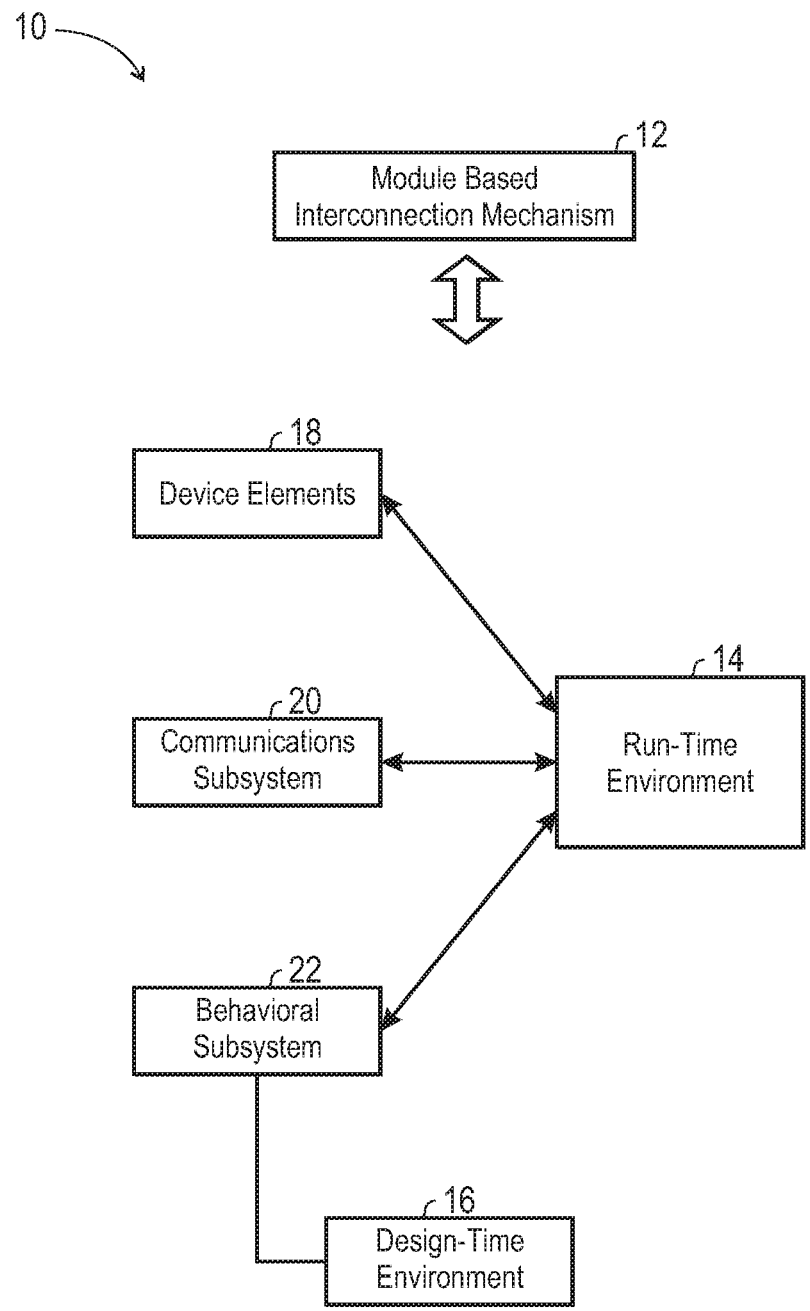
FIG. 1 is a general overview of a framework for an interface configuration system in accordance with certain aspects of the present techniques.

A number of facets, components and processes will be described through the following discussion. By way of introduction, a general system overview is in order that situates these innovations in context. FIG. 1 is a diagrammatical representation of an exemplary control and monitoring software framework 10 for an interface. The framework 10 facilitates building functional software by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements are provided as stand-alone code that can be individually programmed, pre-written for use, as in a library, customized in their function and appearance in screens, and interconnected to provide information to a user as well as monitoring and control functions.

The framework 10 includes two interrelated software environments that can reside on a single system (e.g., computer). Specifically, A run-time environment 14 enables an operator (e.g., a human user) to interact with an application, such as a process during run-time (e.g., during use of the interface, typically during interaction with or observance of a process in operation). A design-time environment permits a designer to configure the interface and its components. For example, a system may graphically present run-time information to an operator via the run-time environment 14 on a display (e.g., computer or interface device screen). Further, the system may include means (e.g., a keypad) for accepting operator input that can be detected and managed via the run-time environment. The environments interact as described in detail below, in innovative ways to provide greatly enhanced programming and use of the interface.

The run-time environment includes or provides access to device elements 18. The device elements 18 are software components that may include any accessible or configurable element in a software environment. For example, the device elements 18 include software components, such as "ActiveX" controls or ".NET" components that are managed by the run-time environment 14. "ActiveX" and ".NET" refer to object-oriented concepts, technologies and tools. Those skilled in the art will be well-acquainted with such programming approaches generally. In the present context, such standards should be taken as merely examples, and "device elements" should be understood as including any generally similar components or self-sufficient programs that can be run as quasi-independent elements, sometimes referred to as "objects". Other standards and platforms exist for such elements, typically championed by different companies or industry groups.

Because such device elements are basic to certain of the inventive concepts, a few words of introduction are in order. Device elements generally include four features: properties, methods, connections (or connection points) and communications interfaces. Properties are attributes that can be adjusted, such as to define an image or representation of the element in a screen view, as well as its location on the screen, and so forth. A method is an executable function (sometimes referred to herein as the elements "functionality" or "state engine"), and defines an operation performed by execution of the element. A connection is a link between elements, and can be used to cause data (read from a memory or written to a memory) to be sent to another element.

Specific examples of device elements 18 may include software pushbuttons, timers, gauges, PLC communication servers, screens, and applications. In general, virtually any identifiable function may be configured as such an element. Moreover, as discussed below, such elements may communicate with one another to perform a wide range of display, monitoring operations and control functions. It should be noted that device elements 18 do not require special limitations for supporting a design mode. Also, while elements associated with an image are quite useful, particularly for screen views, many elements may not have a visual representation, but may perform functions within an HMI, such as calculations, or even management and data exchange between other elements.

The run-time environment typically operates using a communications subsystem 20. The communications subsystem 20 is adapted to interconnect the device elements 18. In practice, the communications subsystem 20 may be thought of as including the connections of the device elements. However, it may include a range of software, hardware and firmware that send data to and receive data from external circuits, such as PLC's, other computers, networks, satellites, sensors, actuators, and so forth.

The run-time environment typically operates using a behavioral subsystem 22, which is adapted to manage the behavior of the device elements 18. For example, responsibilities of the behavioral subsystem 22 may include the following: place and move device elements, modify device elements, group device elements on interchangeable screens, save and restore screen layouts, manage security, save and restore connection lists, and supply remote access to the run-time environment 14. Here again, in practice, such behaviors may be defined as part of the profile (i.e., the "method" or "state engine") of each device element.

The design-time environment 16 includes an advanced implementation of the behavioral subsystem 22 that facilitates direct or indirect manipulation of the run-time environment 14, without impeding or compromising the behavior of the run-time environment 16. That is, design and reconfiguration can be done even while an interface is operating. The behavioral subsystem 22 extends access to the run-time environment 14 via remote provision of the design-time environment 16, such as in a conventional browser. The behavioral subsystem 22 allows a designer to interact with and change aspects of the run-time environment 14 of an HMI via a remote configuration station by serving the design-time environment or aspects thereof to the configuration station from the HMI. For example, an HMI coupled to a laptop via a network may provide a user with configuration capabilities by serving up a specific design-time environment to the laptop via the network.

Details and examples of how this may be done are provided below. In current embodiments, the design-time environment may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build screen views without prior knowledge of either the functionality of device elements, or their interrelationships.

By facilitating changes to device elements, the design-time environment allows the designer to make interchangeable design-time models or specialized implementations of the behavioral subsystem 22. A specific example of a design-time implementation of the behavioral subsystem 22 includes a Web-based design-time environment, which extends access to a run-time environment on an HMI via a TCP/IP connection between the HMI and a remote device. The Web-based design-time environment facilitates management of the device elements without compromising run-time performance or security. In one specialized implementation the behavioral subsystem 22 gives designers the ability to manipulate aspects of the run-time environment 14 using a Web browser that is capable of accessing a related interface or HMI. As noted above, and as described in detail below this is achieved by using a combination of dynamic content, scripting, and configuration of the device element properties.

Figure 2:
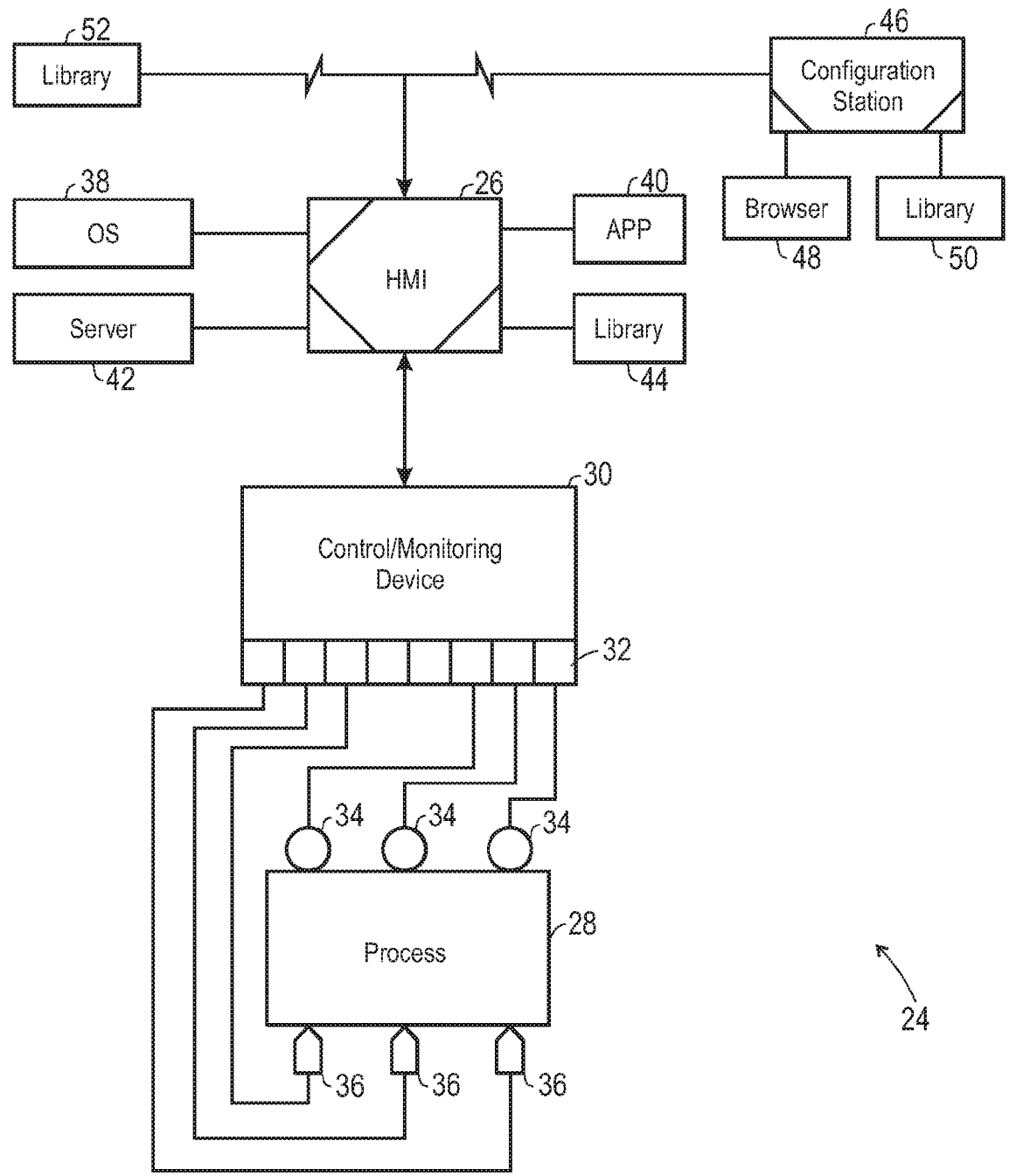
FIG. 2 is a diagrammatical overview of an exemplary implementation of an interface for monitoring or controlling a process.

FIG. 2 is a diagrammatical representation of an exemplary control and monitoring system 24, such as for industrial automation, implementing the framework described above. The system includes an HMI adapted to interface with networked components and configuration equipment. The system 24 is illustrated as including an HMI 26 adapted to collaborate with components of a process 28 through a control/monitoring device 30 (e.g., a remote computer, programmable logic controller (PLC) or other controller). The HMI 26 may physically resemble existing hardware, such as a panel, monitor or stand-alone device.

Collaboration between the HMI 26 and components of the process 28 may be facilitated by the use of any suitable network strategies. Indeed, an industry standard network may be employed, such as DeviceNet, to enable data transfer. Such networks permit the exchange of data in accordance with a predefined protocol, and may provide power for operation of networked elements. As noted above, while reference is made in the present discussion to networked systems and to systems incorporating controllers and other equipment, the HMI 26 and programming techniques described may be equally well applied to non-networked components (e.g., GPS displays, game displays, cell phone displays) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI. When loaded, the stored application framework may be adapted to create screens and locate user interface device elements (actually images or pictorial representations corresponding to the elements) in the screens. These applications, screens, and user interface elements are each types of device elements. As described below, the HMI 26 includes a stored application that dictates the layout and interaction of the device elements. The Web-based design-time environment, which is based on a run-time engine, is also loaded and resident on the HMI. The design-time environment may be adapted to handle advanced features (e.g., security management) for both design-time and run-time environments.

The HMI may be adapted to allow a user to interact with virtually any process. For example, the process may comprise a compressor station, an oil refinery, a batch operation for making food items, a mechanized assembly line, and so forth. Accordingly, the process 28 may comprise a variety of operational components, such as electric motors, valves, actuators, sensors, or a myriad of manufacturing, processing, material handling and other applications. Further, the process 28 may comprise control and monitoring equipment for regulating process variables through automation and/or observation. The illustrated process 28 comprises sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., a PLC) and may be assigned a particular address in the control/monitoring device 30 that is accessible by the HMI 26. The sensors 34 and actuators 36 may be in direct communication with the HMI 26. These devices may be utilized to operate process equipment. Indeed, they may be utilized within process loops that are monitored and controlled by the control/monitoring device 30 and/or the HMI 26. Such a process loop may be activated based on process inputs (e.g., input from a sensor 34) or direct operator input received through the HMI 26.

The server software on the interface permits viewing of the development environment, and direct reconfiguration of the interface (particularly of the device elements and their associated appearance and functionality) without the need for special viewing or configuration software. This benefit flows from the fact that the device elements and the design-time environment itself is resident in the HMI, and "served up" by the HMI to a browser or other general purpose viewer on the configuration station. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 26, through the programming of the device elements as described below, may be thought of as including instructions for presenting one or more screen views, and device elements executed upon interaction with the HMI by reference to the screen views (e.g., pressing a button, touching a location of a screen, and the like). The screen views and device elements may be defined by any desired software or software package. For example, the screen views and device elements may be called by or executed by an operating system 38. The device elements, as discussed above, in accordance with present embodiments, are objects conforming to ".NET" or "ActiveX" standards. The operating system itself may be based upon any suitable platform, such as Window CE. As referenced herein, the device elements and tools support Web services or technology for transmitting data over networks (e.g., the Internet). These device elements thus follow a set of rules regarding information sharing and are adapted for use with various scripting and programming languages, as described below. Such device elements enable provision of interactive content to outside applications such as a LAN, WAN, an intranet, an extranet, or even the World Wide Web. Accordingly, the operating system 38 and the various device elements facilitate dynamic configuration of the HMI 26 through a browser by allowing configuration access (e.g., serving up) to the browser.

For example, such configuration access includes access for instantiation of device elements. In other words, new device elements can actually be created and implemented from the browser. Again, it should be noted that the browser does not require actual functional access. Indeed, in one embodiment, requests via the browser result in a "draw" sequence of operations based on data functionality and content of device elements in a container, thus allowing illustration of the device element representations and access to their configuration without actually serving up functional aspects. This allows for configuration via a remote workstation without necessitating technical support for the remote workstation. Such aspects are described in greater detail below.

In addition to the operating system and device elements as described above (and as described in greater detail below), the HMI 26 includes an application or application layer 40. The application, which may itself comprise a device element, facilitates access to and acquisition of information from the various device elements of the HMI. In particular, the application 40 represents a first level in a multi-level device element that can be enumerated for execution. The application 40 in a practical implementation may comprise a user application in the form of an XML page. The user application is then interacted with by the user or operator, as well as by the designer as described in greater detail below.

The screen views and device elements may be described as independent executable pieces of software. In a present implementation, the screen views are defined by appropriate code written in a markup language (e.g., Hypertext Markup Language or HTML). Thus, the configuration of graphical interface screens for the HMI 26 may be performed without the use of conversion programs. Further, by programming of the device elements, the screen views may be developed directly on the HMI 26 via resident server software (designated as server 42) that makes the resident development environment available for remote access. Specifically, in one embodiment, representations of certain device elements (e.g., ActiveX controls) are served up to the browser without serving up the software components themselves. Because a development or design-time environment may be accessed via a browser, the need to download changes to the screens and to update remote configuration software applications can be eliminated.

As noted above, device elements may include functionality by which they read from or write to specific memory or registers of memory, typically in other devices (but which could also be within the HMI). For example, a particular function may correspond to writing to or reading from a register 32 of control/monitoring device 30. In a simple case, for example, an object simply accesses a piece of data (e.g., a state of a component as determined by a sensor), and generates an output signal to write a value corresponding to the state of a different networked device. Much more complex functionality can, of course, be configured. In an industrial control and monitoring context, for example, such device elements may emulate operation of a range of physical components, such as a momentary contact push button, a push button with delayed output, a switch, and so forth. Many pre-programmed device elements may be available for use by the HMI 26. Such functional modules may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements may reside on the HMI 26 to facilitate configuration of the HMI 26, as described below. The screen instructions may call upon the device elements for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements associated with the instructions (e.g., with specific locations triggering calls or execution of pre-configured device elements) the desired functions may then be executed. Accordingly, the operator is enabled to interact with a process, typically to change screen views, write to registers, or command the generation of other output or control signals. In a stand-alone implementation, the interactions may simply recall or store data, change screens, and so forth.

One or more separate interface screens may be employed, with some HMIs having many such screens and a great number of device elements. Each device element may, in turn, be uniquely programmed to consider specific inputs, perform specific functions, and generate signals for specific outputs. A plurality of such device elements can be loaded and hosted in a single software "container" (e.g., ActiveX container) as described below.

The HMI may be configured by interacting directly with a panel or screen on the HMI itself (if one is present), but in many cases configuration will be performed from a remote configuration station 46. For example, access is provided directly to the resident library 44 and/or operating system 38 and application 40 via a browser 48 or similar application. In a present implementation, no other specialized software is required at the configuration station 46. Indeed, the server 42 resident on the HMI 26 may provide access to the device elements in library 44. By storing the device elements in library 44 directly on the HMI 26, the risk of version conflicts and so forth are eliminated or reduced. Additionally, the HMI may be directly connected to the configuration station, or accessed by reference to an IP address (Internet Protocol address) assigned to the HMI 26.

Access control schemes may be used to limit the ability to change screens and device elements. For example, a password or user access status may be required to gain such access. Further, in a presently contemplated embodiment, the configuration station automatically recognizes the HMI or the terminal on which the HMI is resident as a device upon being coupled to the configuration station (e.g., similar to an external memory or drive). Thus, once connected to the configuration station, the HMI may simply be "recognized" as a device that can be accessed (providing the configuration screen and tools described below).

Once the device elements then resident on the HMI 26 are accessible to the configuration station 46, aspects of the HMI 26 can be modified or updated directly on the HMI 26 via the communication link from the configuration station 46. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements via the configuration station 46 and use them to modify the HMI graphic or functionality in a development environment.

It should be noted that additional device elements can be added to the library 44. For example, if a trending device element is not resident on the HMI 26, a user can download such an element to the HMI 26 from a configuration library 50 resident on the configuration station 46. Alternatively, a user could access the trending device element from a resource library 52 accessible via a network (e.g., the Internet), either directly to HMI 26 or through the configuration station 46. This may be particularly beneficial because new and improved device elements can be downloaded to the HMI 26 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 26, version conflicts with the embedded code may be avoided and the necessity for configuration station software upgrades may be eliminated.

Figure 3:
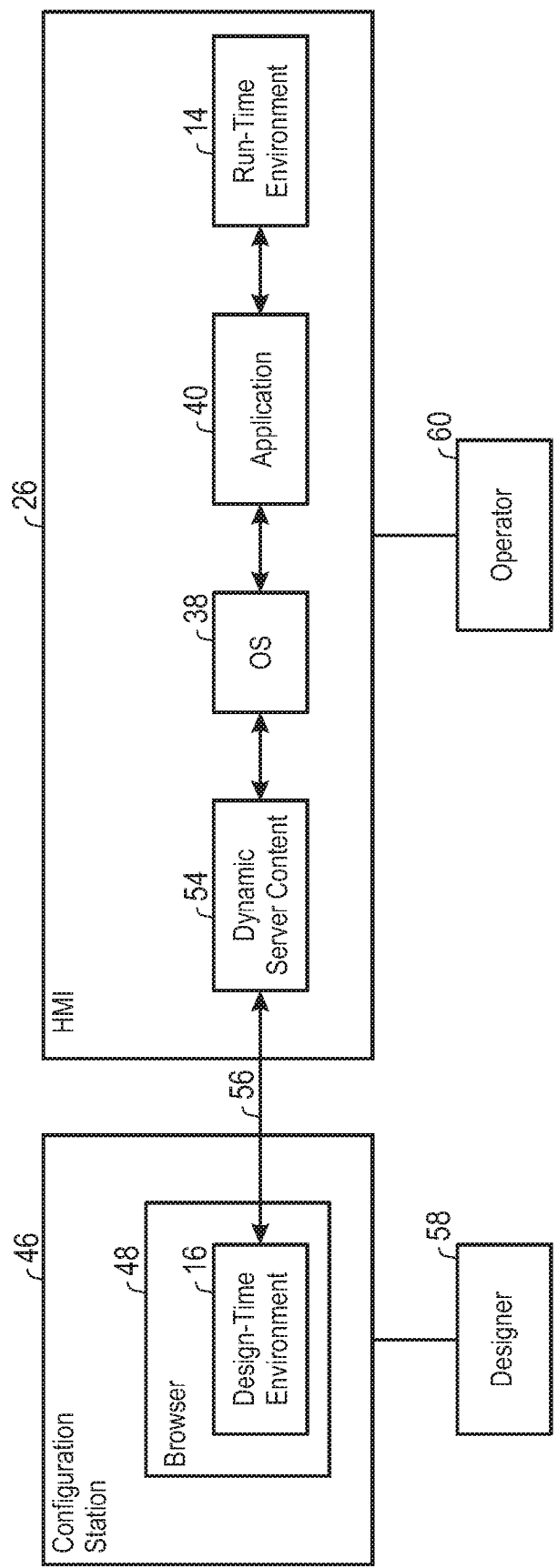
FIG. 3 is an overview of certain of the functional components in an interface and a configuration station in accordance with aspects of the present technique.

FIG. 3 is a high-level flow diagram representing interaction between an HMI and a configuration station. More detail regarding such processes is provided below. In general, a platform for the HMI and configuration station will include the operating system or executive software 38, application software 40, as well as any communication software, a microprocessor, a network interface, input/output hardware, generic software libraries, database management, user interface software, and the like (not specifically represented in FIG. 3). In the illustrated embodiment, a design-time platform and a run-time platform interact within the HMI. The design-time platform provides views that are served as the design-time environment 16 to a desktop personal computer platform (e.g., running a suitable operating system, such as Windows XP or RedHat Linux) and the run-time platform cooperates with the design-time platform via the operating system (e.g., Windows CE, Linux). The design-time platform provides dynamic server content 54, while the run-time platform displays views on the HMI itself (if a display screen is provided on the HMI). The design-time environment 16 is displayed in a browser 48 (e.g., Web browser or other general purpose viewer).

FIG. 3 represents at a very high level how the design-time environment 16 interacts with the operating system 38, application 40 and run-time environment 14. The arrow 56 represents dynamic exchange of content between the HMI 26 and configuration station 46. In general, interaction with the design-time environment is the task of a designer 58 who initially configures the HMI screens or views, device elements, their functions and interactions, or who reconfigures such software. The run-time environment is generally interacted with by an operator 60 directly at the HMI. It should be noted that while the design-time environment 16 has specific needs, in a current embodiment, it depends heavily on the operating system, application and run-time environment. The design-time environment 16 and the run-time environment 14 may utilize certain base technologies (e.g., DHTML, HTML, HTTP, dynamic server content, JavaScript, Web browser) to operate respectively in the design-time platform and run-time platform. While, in the illustrated embodiment, the run-time environment 14 and the design-time environment 26 reside on separate platforms, in some embodiments they may reside on the same platform. For example, the design-time platform and run-time platform may be configured as or considered a single platform.

In one embodiment of the present invention, a design-time Web implementation is utilized. This design-time Web implementation offers the speed and flexibility of software running on the design-time platform by using a Web browser (e.g., 48) with DHTML support from the HMI, as noted by the dynamic server content 54 in FIG. 3 and as described below. DHTML is used to perform dynamic manipulation of Web content in the design-time environment 16. Further, the dynamic server content 54 is used in the HMI to serve dynamic Web content to the design-time environment 16. This dynamic client-server environment allows the Web browser to simulate an application running on the design-time platform without requiring a piece of software compiled for a related processor.

Exemplary Interface Configuration

Figure 4:
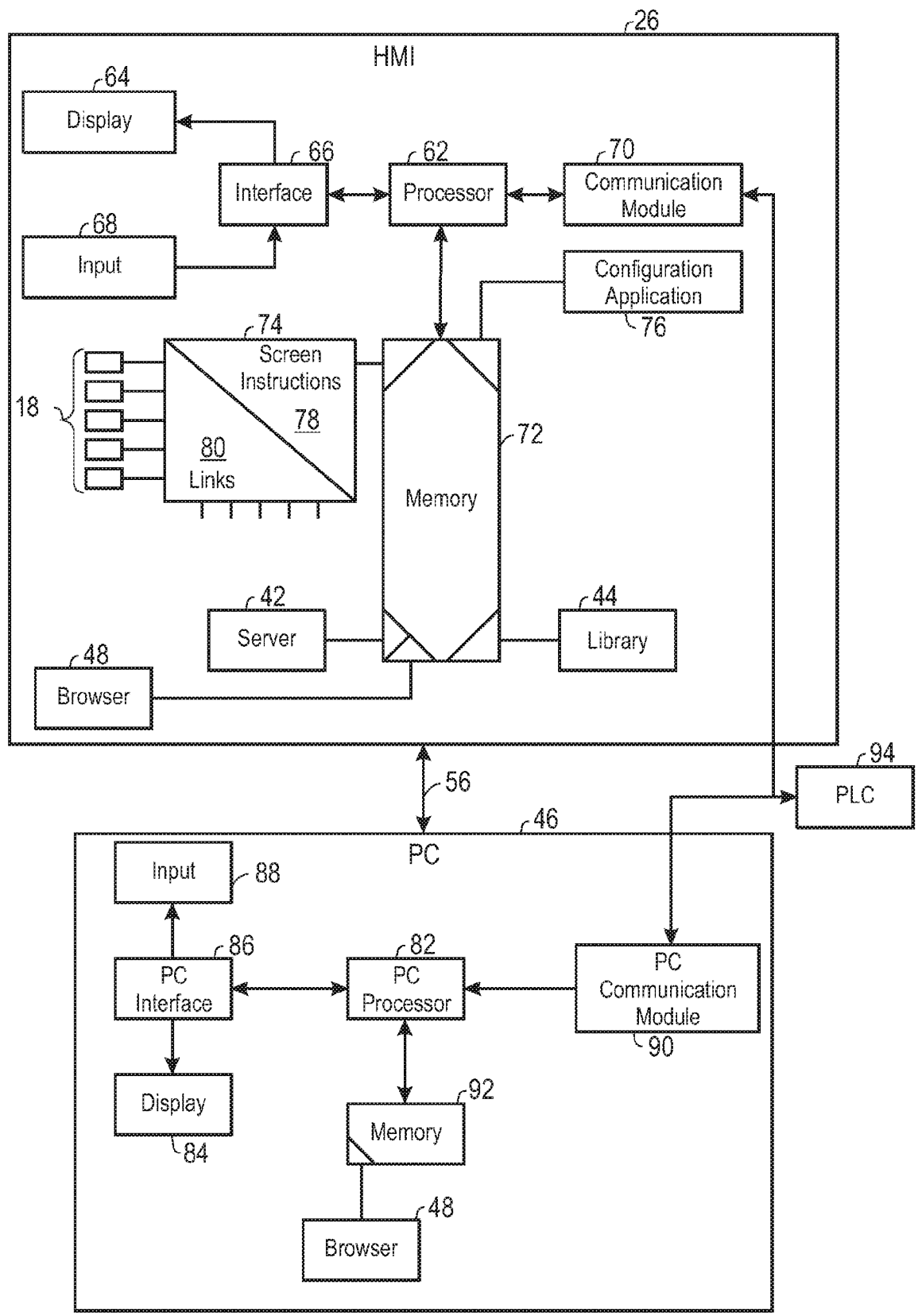
FIG. 4 is a diagrammatical overview of an interface and configuration station in somewhat greater detail, illustrating certain of the functional, hardware and software components.

FIG. 4 is a block diagram illustrating interaction among components of both an HMI and a configuration station in accordance with embodiments of the present techniques. Specifically, an HMI 26 that is in a communicative relationship with a general purpose computer (PC) 46 via data or content link 56. The data link 56 may comprise a direct cable link, a network link, a wireless link, or any interconnecting circuit between locations for the purpose of transmitting and receiving data. For example, the data link 56 may represent, in part, the Internet. Further, both the HMI 26 and the PC 46 are illustrated as comprising certain exemplary components that facilitate operation and communication in accordance with embodiments of the present techniques.

The HMI 26 may comprise a configurable tool built around an HMI microprocessor 62. The HMI 26 may be adapted to interface with an industrial hardware interface such as a programmable logic controller (PLC) 94. While the HMI 26 may comprise many different parts and components, certain exemplary components are presently illustrated to demonstrate aspects in accordance with embodiments of the present techniques. Specifically, in addition to the processor 62, the illustrated embodiment includes a display module 64 (e.g., a graphical component or physical display screen), a display/input interface module 66, an input module 68 (e.g., keypad or touch-screen), a communication module 70 (e.g., TCP/IP component), and memory 72. In accordance with the present techniques, the memory module 72 may store computer programs and components such as a markup language page 74 (e.g., HTML page), a control object library 44, and embedded code defining a configuration application 76.

The markup language page 74 may include any document created in a markup language that can be displayed. Multiple pages, such as page 74, may be stored in memory 72 for utilization in interfacing with a system or process. As discussed above, each such page will typically comprise screen instructions 78 and links 80 to pre-programmed functional modules or device elements. For example, the links 80 may cooperate with certain device elements 18 to facilitate display of system parameters and/or control of a related system or process. The HMI 26 may provide access to such pages and configuration of such pages using a server program 42 (e.g., an ASP server) stored in memory 72. Additionally, the HMI 26 or an external configuration station (e.g., PC 46) may utilize such pages by employing a standard browser program 48. In accordance with embodiments of the present techniques, software components related to the page 74 facilitate a configurable development environment. In one embodiment, the development environment itself is configurable. Accordingly, as described below, fixed components of the development environment (e.g., a banner) can be changed for aesthetic or functional purposes. For example, a customer purchasing an HMI in accordance with embodiments of the present technique can change a banner in the development environment to display a customer logo rather than a manufacturer logo. A user can make changes to the development environment in the same way changes are made to object properties.

The device elements 18 may comprise modular control strategies and graphical components that enable system configuration and operation. For example, the device elements 18 may include modules for configuring one or more field devices (e.g., inputs and outputs) and related control logic (e.g., expressions). Indeed, these device elements 18 may be adapted to provide reusable configurations for process equipment, sensors, actuators, control loops and so forth. As discussed above, in accordance with embodiments of the present techniques, available device elements may reside in a library stored on the memory module 72. Each device element 18 in accordance with present techniques may include a unique control tag, a data history, a display definition, and a control strategy (i.e. stat engine). Further, each device elements 18 may be a separate module, enabling operation, debugging, and transfer of individual elements 18 without affecting other elements. In many settings, and particularly in industrial automation contexts, "families" of such elements may be pre-defined, such as for various types of push buttons, trending modules, and so forth.

As discussed above, the application 76 may cooperate with separate server application 42 that is stored on the HMI to provide access to configuration of the HMI 26. Alternatively, the application 76 may itself comprise a server module to perform such a function. A user may remotely configure the HMI 26 from the PC 46 using a browser 48. The application 76 may comprise the configured device elements that configure the markup language page 74. For example, the application 76 may allow a user to configure the page 74 in a development environment for use as a graphical interface in the HMI 26. Once configured, the page 74 may be saved as a file, and implemented in an operation mode of the HMI 26, where the page 74 may be utilized as an operable graphical interface. Each device element 18 may be an independent executable piece of software that can communicate with other elements to perform complex functions.

The PC 46, much like the HMI 26, may comprise a general purpose tool built around a microprocessor 82. The illustrated PC 46 is adapted for interface with the HMI 26 through data link 56 to facilitate configuration of the HMI 26. While the PC 46 may comprise many different parts and components, certain exemplary components are presently illustrated to demonstrate aspects in accordance with embodiments of the present techniques. Specifically, in addition to the processor 82, the illustrated embodiment includes a display module 84 (e.g., a graphical component or physical display screen), a display/input interface module 86, an input module 88 (e.g., keyboard), a communication module 90 (e.g., TCP/IP component), and a memory 92. In accordance with the present techniques, the memory module 92 may store computer programs and components such as the browser application 48. In accordance with some embodiments, the browser application 48 may be adapted to display a markup language page, such as page 74. Indeed, the browser 48 may be the equivalent to the browser 48 of the HMI.

Figure 5:
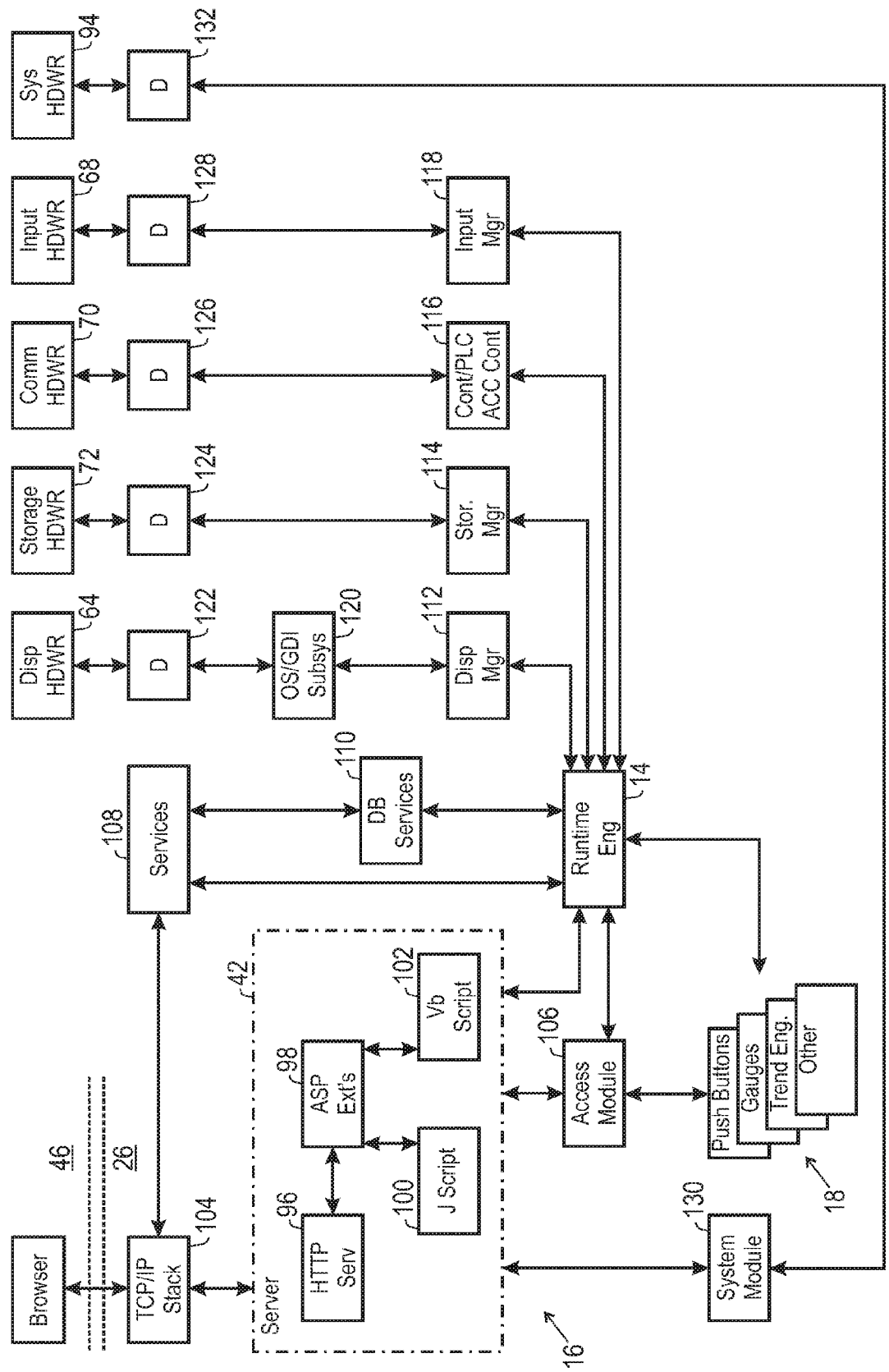
FIG. 5 is a detailed blocked diagram of certain device elements and components contained in an interface for facilitating configuration and use of the interface in accordance with aspects of the present technique.

FIG. 5 illustrates certain of the functional components contained in a present embodiment of an HMI 26 built upon the overall structures described above. In particular, FIG. 5 illustrates server software 42 contained generally in the design-time environment or engine 16. As described more fully below, the server software 42 permits dynamic content to be provided to a browser 46 that will be displayed in the configuration station. The server software 42 also facilitates interaction with the run-time environment or engine 14 and with the various device elements 18 configured within and stored within the HMI. Moreover, within the HMI is software, also described below, which facilitates interaction with display hardware 64 of the HMI itself, storage hardware or memory 72 of the HMI, communications hardware 70 of the HMI, input hardware 68 of the HMI, and generally with system components 94 which will be remote from but interconnected with the HMI.

The server software 42 generally includes an HTTP server component 96, an ASP extensions component 98, a Java script component 100 and a VB script component 102. As will be appreciated by those skilled in the art, in a present implementation, the HTML server service component 96 receives and transmits data by means of a TCP/IP stack 104 which is exchanged with the browser application contained within the configuration station. The HTTP server module 96 itself preprocesses portions of code received via the TCP/IP stack 104 based upon code extensions in the form of "ASP" extensions. While various other alternative scripting may be employed, and a present implementation ASP extensions are used to convey to module 98 that scripting functions are to be performed. The ASP extensions module 98, then, handles the ASP content as described below. Various alternatives to such ASP scripting might include Java service pages (.JSP scripting), CGI scripting, API scripting, and so forth. The Java script module 100 and the Vb script module 102 are provided as examples of interpreters for the server side scripting.

As will be appreciated by those skilled in the art, various existing approaches have been used for scripting, including using ASP extensions. Such applications typically involve modifications to a database. That is, in order processing software and applications, such extensions may be used to alter order status, inventory levels, and so forth. In the present application, such extensions are used, and more generally such server side scripting is used entirely differently. Here the scripting is used to access device elements, enumerate such elements to determine their identifies and properties, compile views that can be provided to the designer, and perform all such functions without prior knowledge of the application or device elements themselves, and also without serving the actual code or device elements themselves. The server software 42 thus provides a highly flexible platform, particularly in conjunction with the access module 106 described below, that can be used with any underlying configuration or device elements to provide a simple and user-friendly design-time environment served to a general purpose browser.

Access module 106 is itself a device element. This module runs in the web services processing space (See, services module 108 in FIG. 5). In general, the access module 106 is called by the server module 42 to process code flagged by ASP extensions. The access module 106, then, accesses various device elements which are configured within the HMI as described more fully below. As illustrated in FIG. 5, such device elements may include push buttons, gauges, trend engines, and so forth. In a more general context, such device elements may include any graphical elements used for interacting with an HMI or any other display that may or may not communicate with a process. As described above, such device elements may include elements only of the display which is a stand-alone device. In certain environments, for example, the HMI may be a communications device, such as a cell phone, a location device, such as a GPS receiver, or any other human interface device. It should also be noted that the device elements 18 need not all have a viewable content component. That is, many device elements may be configured that are not represented in either the browser of the design-time environment or the viewable screen of the HMI itself. Such device elements may perform computations, control functions, locating functions, in various processing that is simply not viewed by the user.

The services module 108 and the run-time engine 14 communicate with a database services module 110 and with one another. As described more fully below, the services module 108 loads and maintains services (e.g., DLL's), such as a stack and server software as a single process space. The run-time engine or environment 14 itself may include a range of software components or device elements, such as a shared memory manager, a development system manager, a display manager, a project manager, and so forth. The run-time engine 14 interfaces with the device elements 18 and with various other software, which also may be configured as device elements. Among the noted software components, is a display manager 112 that interacts with an OS/GDI subsystem 120 and a suitable driver 122 to provide viewable content to the display hardware 64. Similarly, run-time engine 14 interacts with a storage manager 114 and suitable driver 124 to write and read data from storage hardware 72 within the HMI. The run-time engine 14 to also interacts with a controller/PLC access control module 116 and suitable driver 126 to provide access during interaction with any remote controllers or PLC's, particularly in automation context. Finally, the run-time engine 14 interacts with an input manager 118 and suitable driver 128 for overseeing the inputs from input hardware 68, such as actual or virtual push buttons, a mouse, a keyboard, and so forth. As also noted in FIG. 5, a system module 130 can interact with the server software 42 to provide direct access through a suitable drive 132 to remote system hardware 94.

Figure 6:
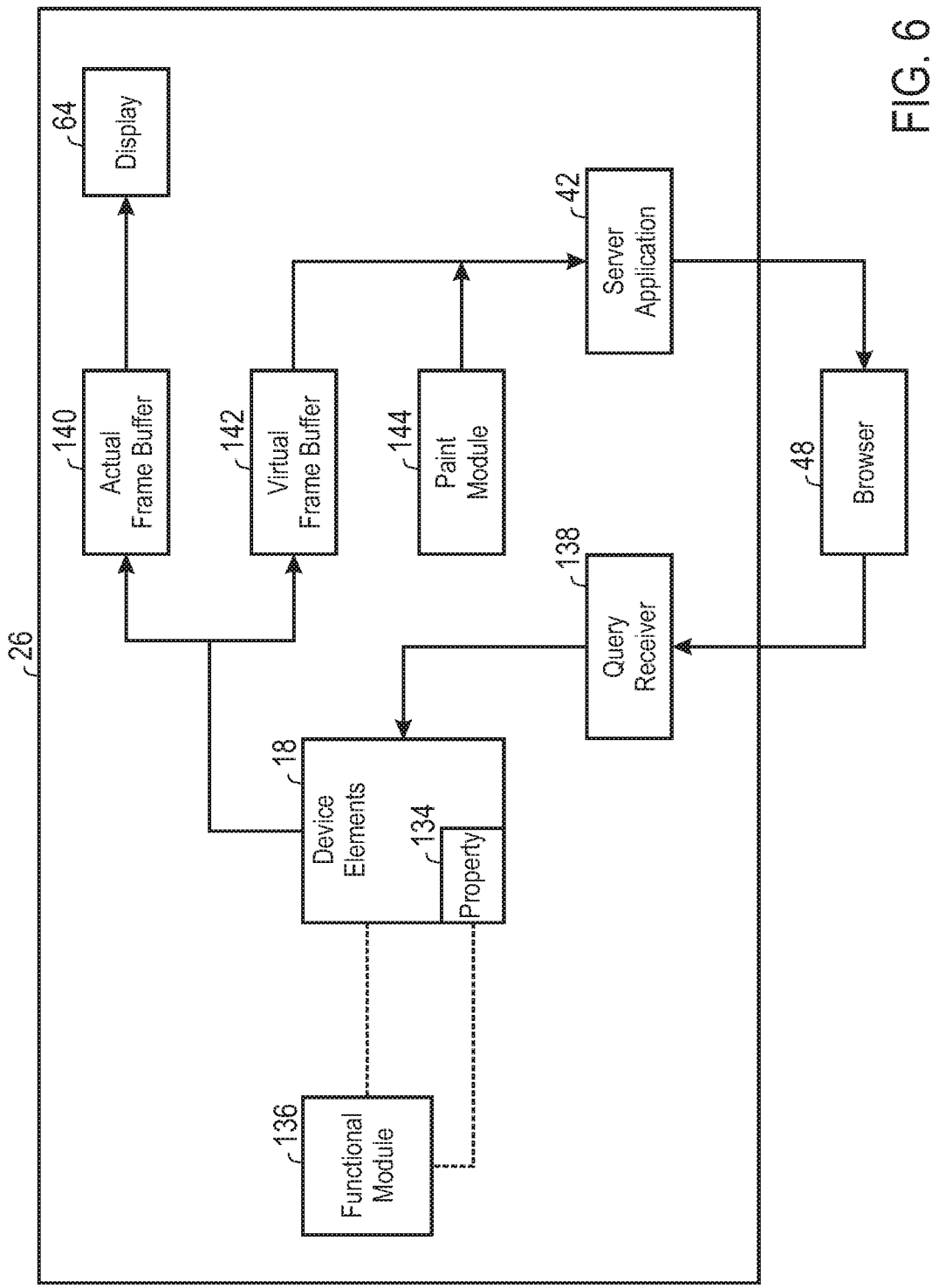
FIG. 6 is a block diagram of certain of the functional components of an interface particularly suited for parallel display of visual elements corresponding to device elements contained within the interface.

FIG. 6 is a block diagram generally representing a configurable interface and its interaction with a browser in accordance with embodiments of the present technique. The configurable interface is generally referred to by reference number 26. The configurable interface 26 is adapted to communicate with browser 48. For example, a "paint" module 144 resident on the configurable interface 26 may signal the browser 48 to "repaint" a graphic display presented by the browser 48 based on changes to certain visual properties residing in software components of the configurable interface.

Specifically, FIG. 6 illustrates the configurable interface 26 including a device element 18 that is adapted to provide a functional module or portion 136 for configuration in the designations environment. The device element 18 includes a property 134, such as relating to a pictorial view of the functional module 136. The configurable interface 26 also includes a query receiver 138, an actual frame buffer 140, a virtual frame buffer 142, a display 64, and a server application 42 as described above.

Embodiments of the present technique relate to abstracted display building based on modification to software components via queries. Queries are utilized in accordance with embodiments of the present invention to transfer configuration input to software components in the configurable interface from a browser application on the configuration station. In one embodiment, communication is facilitated between the configurable interface and the configuration station by unique utilization of a server, such as an ASP (Active Server Pages) server as mentioned above. Accordingly, modifications may be made to an HMI by composing new or modifying existing screen instructions, and by adding, removing, or modifying device elements called or executed in response to user inputs made by reference to the displayed HMI screens. A design can manipulate graphical representations on a browser to change actual control objects on the HMI.

Changes to graphical representations on the browser are submitted as a query to the HMI, which receives the query and adjusts aspects of the relevant device elements accordingly. For example, a color property of a graphic feature may be altered through the browser resulting in a query that operates to instruct a relevant functional module 136 of a device element 18 to change its color property, thus changing the color of the corresponding representation on the HMI and within the design-time environment.

In the illustrated embodiment, and as described in greater detail below, the query receiver 138 is adapted to receive queries from the browser 48 and then transmit the query or related information to the device element 18 for implementation (through the intermediaries of the server software and access module described above). For example, the browser 48 may send a request directed to changing a graphical characteristic (e.g., color) of the functional module 136 (e.g., a virtual pushbutton) as a query. The query receiver 138 receives the query and transmits it to the software component 18 for implementation. Once the request is transmitted, the software component 18 implements the query by manipulating the property 134 in accordance with the query. For example, a designer may change a color of a virtual gauge being represented on the browser 48 from red to blue by manipulating the representation on the browser 48. By thus manipulating the representation on the browser 48, the designer initiates the query that eventually results in changing the property 134 from a value relating to the color red to a value relating to the color blue.

In accordance with embodiments of the present technique, the property 134 will be changed in the actual device element 18 and browser representations. Specifically, in one embodiment, a query relating to new property information is submitted through the browser by manipulating representations of particular software component properties on the browser. This new property information is submitted as a query to the configurable interface 26 and related changes are implemented in the device element 18. The device element 18 then responds by submitting a communication describing the newly implemented property information to the browser 48, which displays revised property representations. This provides a real-time view of changes in configuration while allowing configuration via the browser 48. In one embodiment, changes are made by directly accessing system memory. However, such changes may be made to the actual frame buffer 140 and/or the virtual frame buffer 142 in parallel with changes to memory in the configurable interface 26. Thus, as described below, the design-time environment may provide one representation (e.g., in the browser) of the changes, while the HMI display itself also reflects the change in parallel via the run-time environment or engine.

The device elements available to configure the configurable interface 26 (e.g., HMI 26) and/or related embedded code are accessed from the configurable interface 26 by a configuration station (e.g., 46) during configuration. Accordingly, concerns relating to revision and capability differences between the related software components (e.g., operating system, device elements, drivers, etc.) and the configurable interface 26 are minimal. Functional aspects of the configuration are not necessarily transferred between the configurable interface 26 and the configuration station. As discussed above, in accordance with embodiments of the present techniques, configuration of the configurable interface 26 is achieved through queries submitted via the browser 48. Indeed, the configuration station and the configurable interface 26 do not even need to have, and typically will not have the same operating system.

Dynamic Interface Configuration and Use

Figure 7:
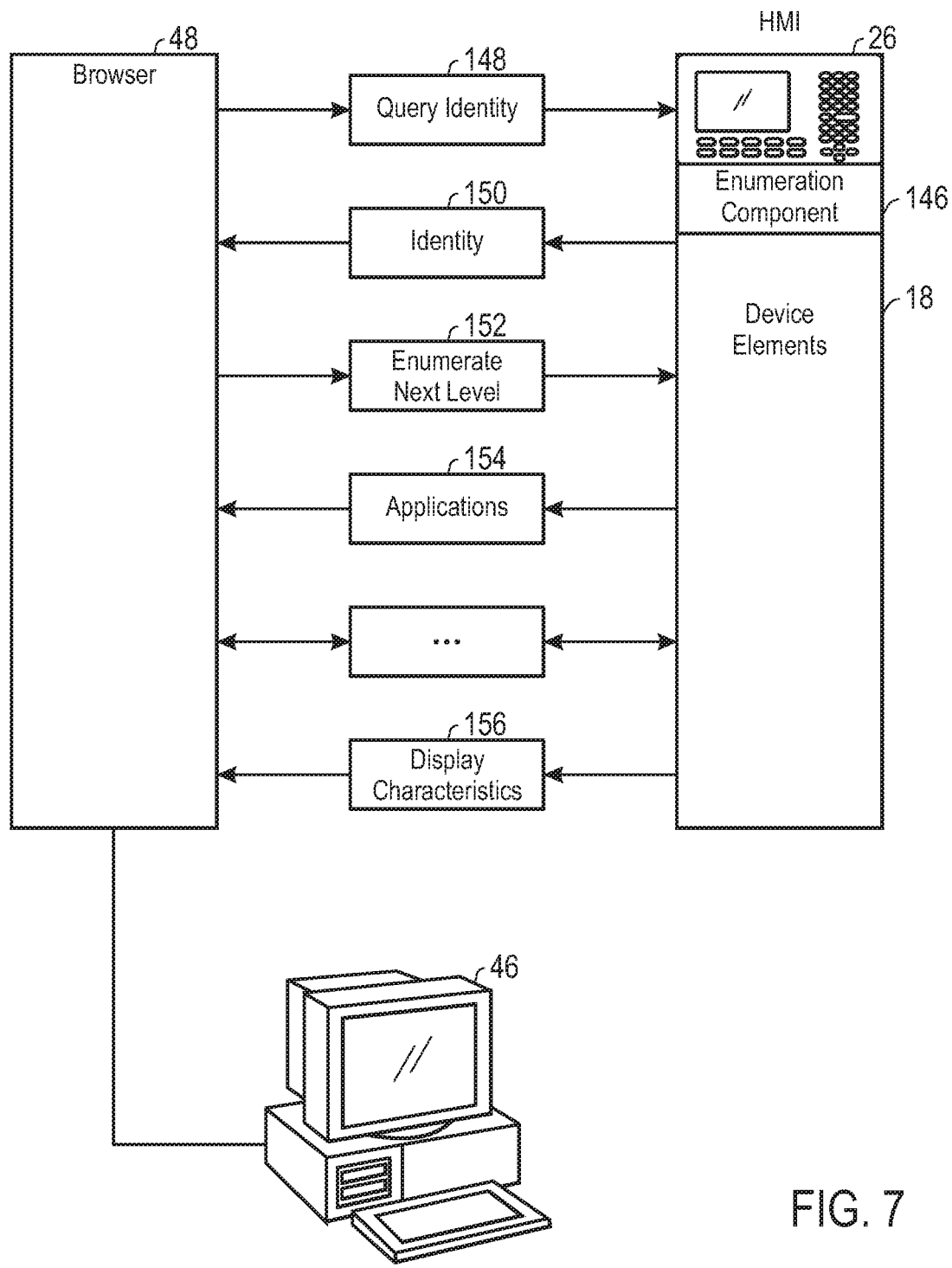
FIG. 7 is a general overview of certain of the steps or acts performed between a browser on a configuration station and device elements within an interface in accordance with aspects of the present technique.

FIG. 7 is a flow diagram generally representing a configurable interface and its interaction with a browser in accordance with embodiments of the present technique. The configurable interface, which is generally referred to as HMI 26, includes device elements 18 and is adapted to interact with a browser 48. As illustrated, this interaction between the HMI 26 and the browser 48 facilitates dynamic representation of configuration of the device elements 18, which are resident on the HMI 26. Further, the interaction includes enumeration by an enumeration component 146 of the HMI 26 (by interaction of the HMI components as described below). It should be noted that the browser 48 may be resident on a remote configuration station 46 (e.g., a laptop computer) in accordance with present embodiments. It should also be noted, however, that configuration may be provided directly on the HMI through the same techniques and architecture described herein.

In the illustrated embodiment, the browser 48 communicates with the HMI 26 by sending queries and receiving responses. For example, in the illustrated embodiment, the browser 48 initiates communication by sending an identification query, as illustrated by block 148, to the HMI 26 requesting specific identity information for the HMI 26. After receiving the query 148, the HMI 26 processes the request and responds with identification data (e.g., "Model 200 Panel View"), as illustrated by block 150. Additional queries are then used to enumerate levels of the application and device elements on the HMI 26 including enumerating the structure of device elements 18. Indeed, the HMI 26 may have a structured content, such as a tree structure (i.e., a set of linked nodes, each having zero or more child nodes), that is readily enumerated. For example, block 152 represents a query requesting enumeration of a next level beneath the identity of the HMI 26. Further, block 154 represents a response corresponding to the query in block 152 indicating what applications are present on the HMI 26. This query and response procedure continues, in accordance with embodiments of the present technique, until display characteristics of the software components are enumerated, as illustrated by block 156. In one embodiment, the query and response procedure continues until an entire tree structure of elements resident on the HMI 26 has been enumerated. It should be noted that much or all of such enumeration may be transparent to the designer, who will be interested in one or more properties of a device element at a time.

In one embodiment of the present technique, once the structure of the HMI 26 has been enumerated, a view is configured for display via the browser 48. For example, a graphic component, such as a Joint Photographic Experts Group or JPEG image may be constructed based enumerated properties and served to the browser 48 as the view or as a portion of the view. Such a JPEG image may correspond to a particular device element. For example, the JPEG image may be representative of particular enumerated display characteristics for a device element. Specifically, the JPEG image may represent a virtual pushbutton or gauge. Further, configuration tools may be served to the browser. Indeed, the view itself may act as a tool for manipulating characteristics of the related device element. Also, for example, a separate display palette may be served to the browser to facilitate reconfiguration of the color of a particular device element.

Figure 8:
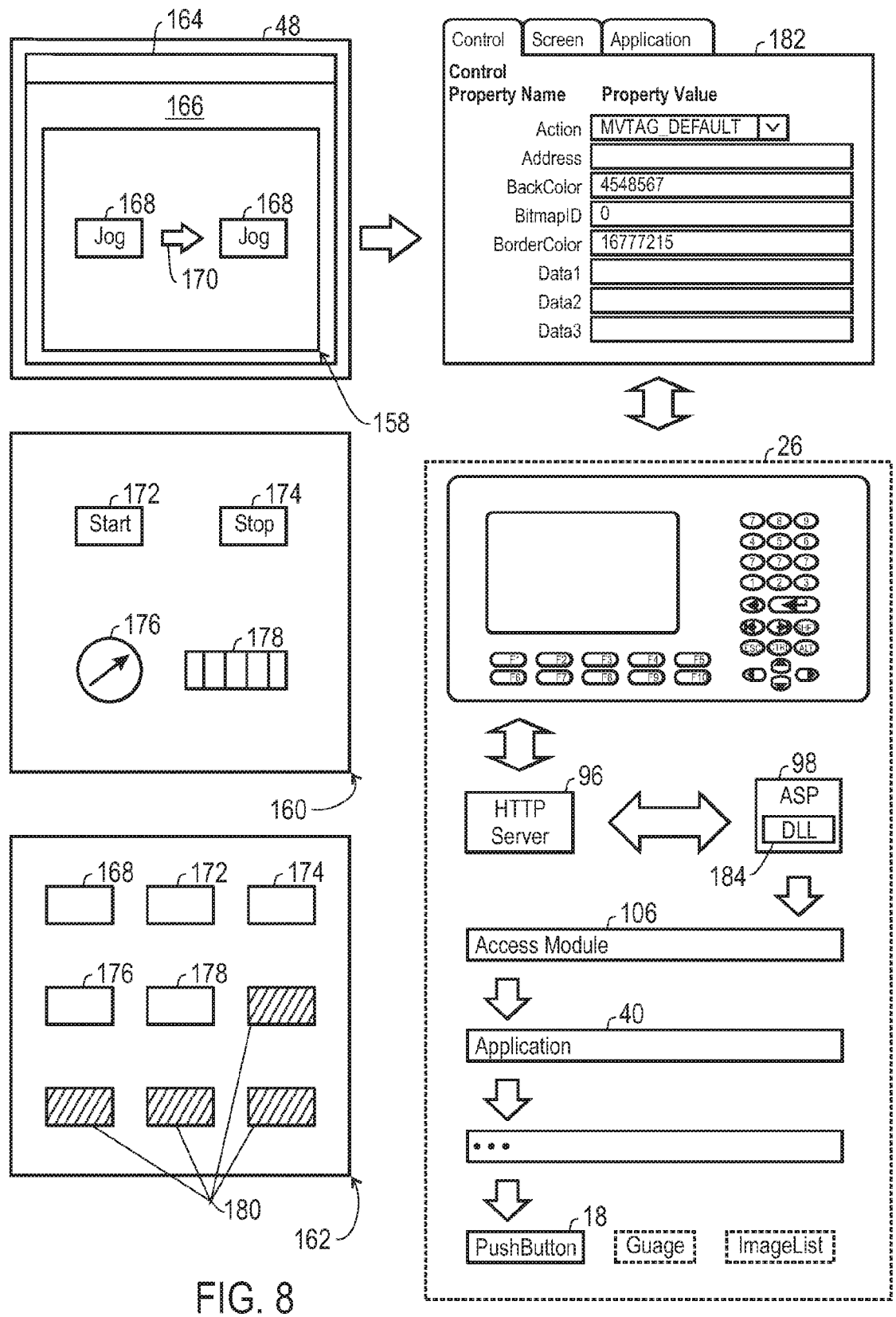
FIG. 8 is a general overview of certain views or containers of device elements and a preferred manner in which they interact to provide rapid access to various views as well as programming and configuration of the device elements themselves.

FIG. 8 is a flow diagram illustrating manipulation of a graphical feature relating to a device element in a design-time environment in accordance with embodiments of the present techniques. While FIG. 8 illustrates a single variable manipulation, multiple graphical features and properties can be manipulated in the same way. The flow diagram includes interactions illustrated by relationships between a display 164 (e.g., a screen for browser display), a property editor 182, and an HMI 26. Specifically, the diagram illustrates exemplary activities associated with moving a device element image 168 represented on the display 164 using a browser 48.

The design-time environment represented by the configuration screen or display 164 includes static content 166 and dynamic content. The dynamic content includes images corresponding to any displayed or represented device elements 168 (e.g., virtual on/off button, gauge). In one embodiment of the present techniques, the image is specified by an image tag in HTML and is part of a JPEG file created by the HMI as described below. The static content 166 may be created by the ASP server or it may preexist in an HTML file. It should be noted that, in some embodiments, designated designers only can edit the static content 166.

In the representation of FIG. 8, the device element representations 168 are contained within a view container 158. As will be appreciated by those skilled in the art, a container generally defines a portion of a processing space in which certain device elements are opened and ready for use. The container 158 may thus correspond to a first view container that includes only the elements viewable within the current screen. As discussed above, many such screens may be provided in the HMI. Other screens, such as alternative control or interface screens may be provided in other view containers, such as a container 160. In general, to speed the operation (e.g., changing between screen views) of the HMI, such view containers are predefined and associated with one another by definition of the individual device elements with which they are either associated or within which representations of the device elements are provided. A global container 162 is defined that include all of the device elements necessary for the various view containers, as well as other elements that may not be represented in any view container. As illustrated in FIG. 8, therefore, view container 158 includes the virtual button 168 which performs a "jog" function and is manifested by a representation in a first screen. New container 160 includes several components, such as a "start" button 172, a "stop" button 174, a virtual gage 176 and a digital readout 178. The global container 162, then, will include all of these device elements for the various view containers, as well as any device elements 180 that are required for operation of the viewable device elements but that are not themselves viewable. Such device elements may include elements that perform computations, trending, communications, and a wide range of other functions.

In accordance with aspects of the present technique, all device elements that are needed for the various views are opened during operation of the HMI and remain open in a single global container 162. However, utilizing aspects of current technologies, known as "tear-offs" any device elements that are not required for viewing or operation of a current view (i.e., a view currently displayed on the HMI or configuration station view) are reduced in size to reduce the memory requirements, processing requirements, and to facilitate operation of the HMI. The "torn-off" device elements nevertheless remain open and active such that change in between screen views is extremely rapid and efficient from memory utilization and processing standpoints.

As illustrated by arrow 170, in an exemplary change or configuration operation, button 168 is moved from one location to another within the display 164. For example, a system in accordance with embodiments of the present technique may include an input device, such as a mouse, that facilitates designer manipulation of the image 168. Client script from the display 164 or some other source running in the browser 48 may be used to monitor device events in the display 164. Specifically, for example, when a mouse press event (e.g., clicking a mouse button) is detected over an image (e.g., image 168) that is tagged as an image and that represents a device element representation, the client script begins tracking the movement and repositioning the image 168 relative to the updated mouse position. In one embodiment, the client script continues to track the mouse movements as long as the mouse button is in a depressed position. When the mouse button in released, a call is passed to a property editor 182 indicating that a device element representation move has been completed. In an alternative embodiment, multiple button presses may be used to initiate the call. For example, depressing the mouse button once may initiate tracking and pressing the mouse button a second time may indicate that the move is complete.

Figure 10:
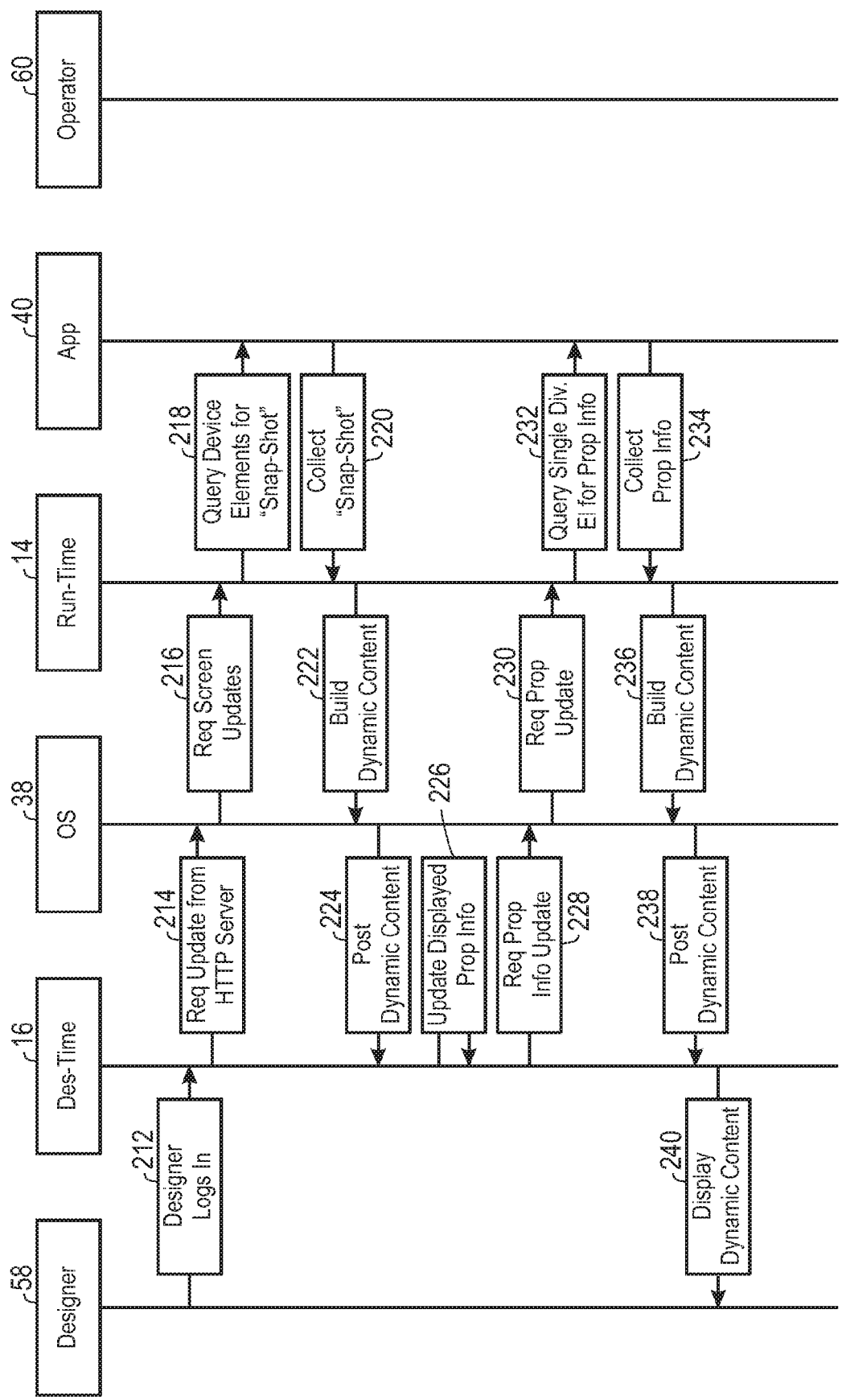
FIG. 10 is a sequence diagram illustrating steps in interacting with a designer for configuring or reconfiguring device elements or properties of such elements.
Figure 11:
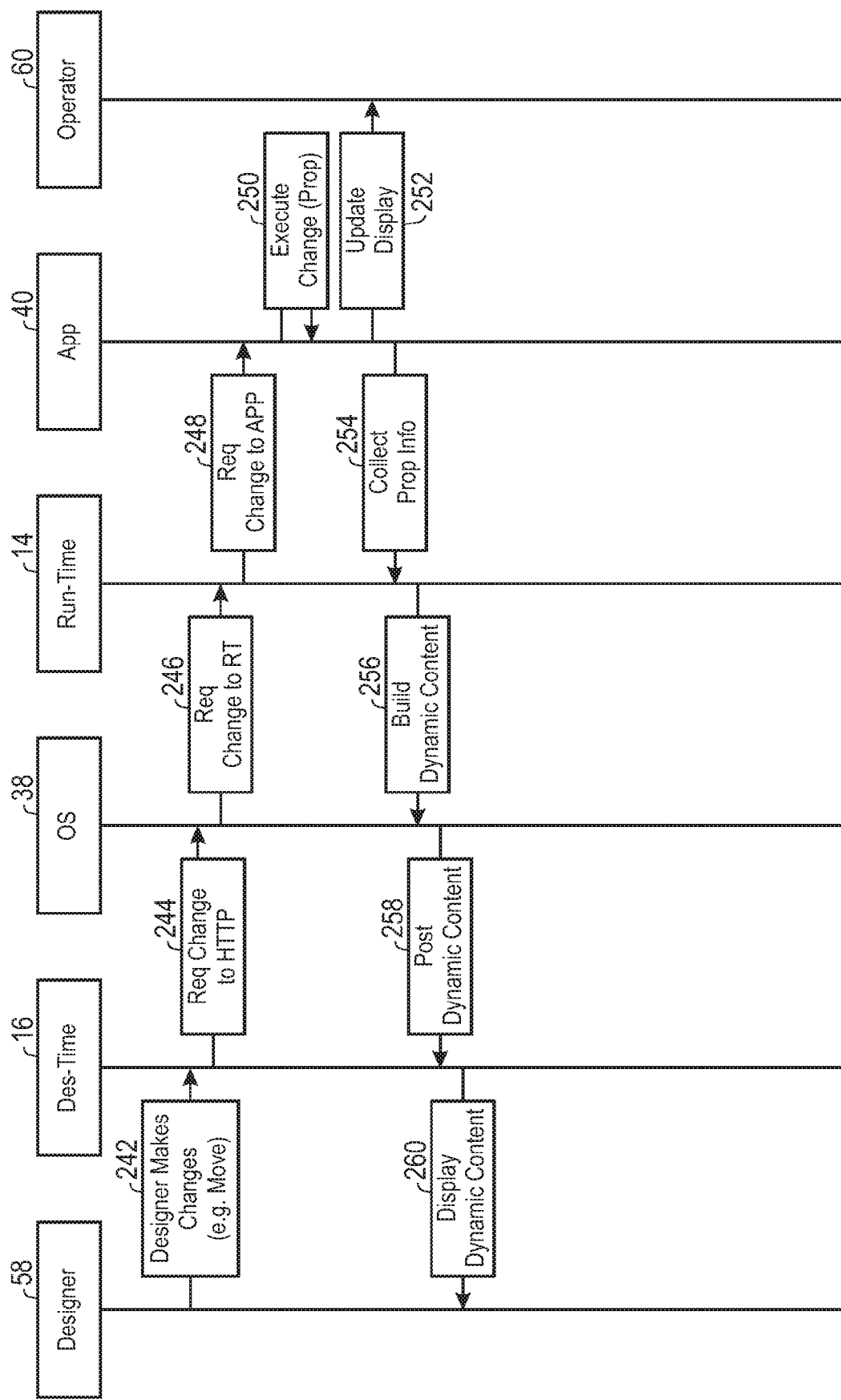
FIG. 11 is a further sequence diagram illustrating interaction with an interface by a designer in accordance with aspects of the present technique.

Upon receiving the call, the property editor 182 reloads itself as described more fully with reference to FIGS. 10 and 11. In one embodiment, this reloading includes passing a move command object pointer, and positional data via a query string from the browser 48 to server 96 (e.g., HTTP server) that is resident on the HMI 26. For example, http://10.90.77.11\MvPropertyASP@M001200200 is an exemplary reload string that may be passed to the server 96. The server 96 cooperates with ASP server 98 including a dynamic-link library (DLL) 184 to receive and respond to queries. The DLL 184 allows for storage of executable routines as separate files, which can be loaded when needed or referenced by a program. In the example set forth above, upon receiving the call, the page is reloaded by the ASP server 98 and the query string is initially parsed resulting in evaluation of the move command. Server side script then invokes the access module 96 to access the device element 18 related to the image 168 and to update its location property. The new property information is then updated on the page and the page is passed to the browser 48.

In one embodiment of the present techniques, user prompting via the display 164, such as the previously described mouse release event of the image 168, causes the reload of the property editor 182 alone. For example, in one embodiment, the display 164 is not reloaded based on the mouse release event. Indeed, in accordance with embodiments of the present techniques, code may actually use functionality that will not require the entire property page to reload.

Figure 9:
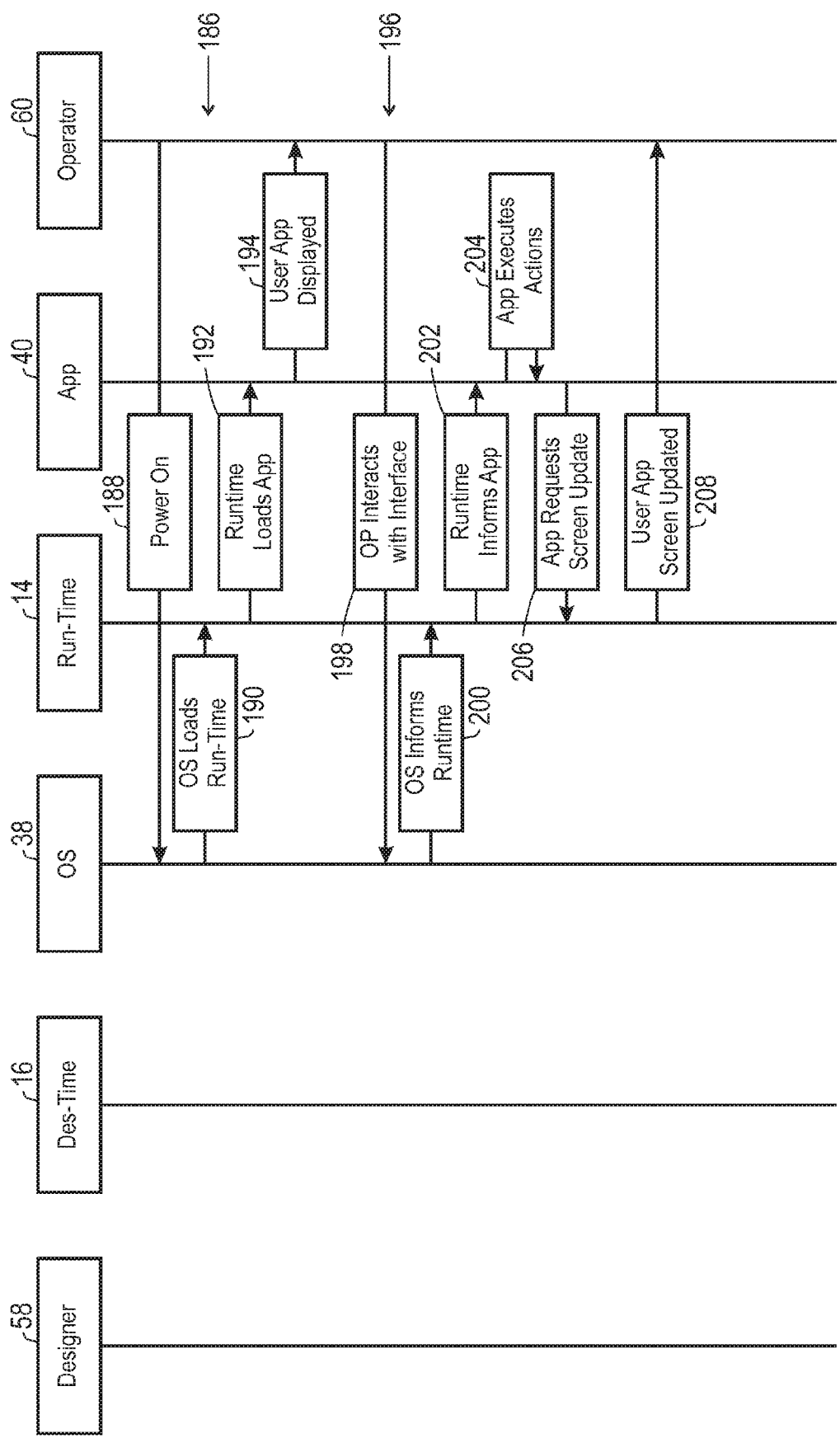
FIG. 9 is a sequence diagram of two exemplary sequences of steps that are carried on within an interface in accordance with aspects of the present technique for interacting with an operator.

FIG. 9 is a sequence diagram for certain operations performed on the HMI or rather configured as described above. In the illustration of FIG. 9, various persons and components generally are represented with operations performed between these entities being shown. The entities involved include a designer 58 and an operator 60 as well as a design time environment and its components 16, the operating system 38, the run-time environment and its components 14, and the resident application of the HMI 40. In the illustration of FIG. 9, a first series of events are designed to display one or more screens programmed into the HMI for an operator. This sequence, identified generally by reference numeral 186 in FIG. 9, is performed when an operator desires to use the HMI. As a first step, the operator powers up the HMI as indicated by step 188. Powering up the HMI activates the operating system 38 which loads the run-time components as indicated by step 190. Loading thee run-time components includes opening and executing all device elements that are required for the various screen views accessible and viewable on the HMI, as well as any device elements that do not include viewable properties. Upon loading the run-time components, the run-time environment loads the application as indicated at step 192. Loading the application instantiates all device elements required for the various views. As noted above, only the currently viewed screen elements, and any device elements required for those elements are fully opened, with other elements being executed in the global container, but torn off to improve memory utilization and processing speed. At step 194, then, the screen views as defined by the run-time environment and application are transmitted to the HMI display for viewing by the operator.

Also represented in FIG. 9 is a sequence corresponding to interaction by an operator with the HMI. In general, this sequence, designated generally by reference numeral 196, is initiated by the operator interacting with the interface as indicated at step 198. Step 198 may be, in practice, initiated by depressing a virtual actual button, touching a location on a touch screen, or inputting information by any other means, such as by a control device, mouse, laptop computer, or otherwise. The operating system 38 detects the input event and informs the run-time environment as indicated at step 200. As a result, the run-time engine informs the application 40 of the input events, and the application, by interacting and with an interaction between active device elements executes any required actions as indicated by reference numeral 204. It should be noted that such actions are generally defined by the state engine of one or more device elements. The state engine of each individual device element may, for example, call for reading a value from a particular register via a network, making a particular calculation, executing trending, updating a view based upon a register value, outputting a value to a device or register, and so forth. At step 206, then, the application requests a screen update from the run-time engine 14. The screen update will, in many cases, choose the appearance of the representation of a device element based upon a change in state. Upon updating of the screen, the displayable view is updated and transmitted back to the display device for viewing by the operator, as indicated by step 208. Thus, the terminal screen will visually indicate the response to the operator interaction.

It should be noted that, as described more fully below, among the many operations that can be performed by the device elements at step 204, such as color changes, sending and receiving values to external registers, and so forth, various direct connections may be made between device elements that greatly facilitate the overall system functionality. For example, a "connection" may be defined between two or more elements such that the receipt of data by one element causes the immediate transfer of the data to a different element. Thus, elements can transmit data immediately among themselves without processing the data by such connections. The operations performed by each element upon receipt of the data are then defined by the programming of the function (or "method") of the state engine of the receiving device element. Thus, as described more fully below, device elements can be caused to mirror or mimic functions of one another (e.g., to provide similar elements viewable at different locations without rewriting redundant code), or entirely different operations can be performed based upon data of interest to multiple device elements.

FIG. 10 represents a sequence of events between the same entities demonstrated in FIG. 9, but for building and displaying dynamic content for configuring or reconfiguring the HMI. The process illustrated in FIG. 10 begins at step 212 where the designer logs into the HMI. This operation may be performed by accessing the HMI via a general purpose browser, such as by typing in an IP address for the HMI in a location window. Various types of access control may also be performed at step 212, such as to limit access to all or part of the configuration functionalities to one or more types of level of designer. For example, initial configuration of the HMI may be performed at a factory, with certain adaptations or user preferences being configurable by access, in a more limited manner, to the device elements as described below. At step 214 the design time engine requests an update from the HTP server. In the terms of the components illustrated in FIG. 5, the request is in a form of a request including an ASP extension transmitted via the TCP/IP stack 104 to the server module 42. At step 216, then, the operating system requests screen updates from the run-time engine. The run-time engine acquires the screen updates by querying device elements for "snap-shots" as indicated at step 214. Step 216 includes enumeration of the various device elements necessary for the particular screen update, and is performed by calling upon the access module 106 shown in FIG. 5 which communicates with the particular device elements of the viewed screen. At step 218, then, the active screen elements are drawn to a memory space as to display the images corresponding to the active elements. At step 220 these "snap-shots" are corrected and converted to JPEG image elements, or to a binary format.

Based upon the image requirements for the various active device elements needed for the view to be presented to the designer, dynamic content is built for viewing as indicated at step 222. Essentially, building of the dynamic content involves determining where certain snap-shots are to be located in a view, and writing HTML tags with the JPEG image data and the corresponding locations for all active panel elements (i.e., device elements having a representation viewable in the screen to be considered). It should also be noted that the building of the dynamic content at step 222 is done in a memory space that is separate and parallel to the memory space used to actually present data to an operator on the HMI. Thus, through the steps of FIG. 10 dynamic content is built and presented without any prior knowledge of the underlying functionality or structure of the device elements or their interconnections. At step 224 the dynamic content is posted to a display frame. Exemplary illustrations of such display frames are provided in the figures below. At step 226 property information, as enumerated at steps 216 and 218 is updated for presentation in a property frame as described more fully below. At step 228 property update information is requested based upon the property information update, a request for property update is generated by the operating system 38 and transmitted to the run-time engine 14 as indicated at step 230, essentially, step 230 is similar to step 216, with both steps generally including additional levels of enumeration of the device elements. Such multiple levels of enumeration are also described above with reference to FIG. 7. At step 232, then, each individual device element is queried for its property information that will be displayed in the property frame. Many such levels of enumeration may be performed, particularly to determine configuration of applications, elements, properties, and with each level itself being capable of having additional device elements and properties associated therewith. At step 234 the property information is collected, such as in the form of an HTML page table.

At step 236, then, the dynamic content of the property frame is built again, in a manner similar to the functions performed at step 222 discussed above. The dynamic content is then again posted as indicated at step 238, and ultimately the dynamic content is displayed as indicated at step 240. In terms of the components illustrated in FIG. 5 and discussed above, such functions are performed by interaction of the server module 42 with the run-time engine 14 and access module 106 which instantiate and enumerate the various device elements to determine their various properties. In all of these operations, again, the static and dynamic content is served to the designer, with the content being written to a memory space separate from the frame buffer used for the HMI display itself.

FIG. 11 represents a similar sequence of steps for interaction between a designer and HMI but for changing one or more aspects of a device element. In the sequence of FIG. 11, a designer first makes a change to a design element as indicated at reference numeral 242. Such a change may, for example, correspond to a move event such as for moving representation 168 illustrated in FIG. 8 to a new location as indicated by arrow 170 in FIG. 8. At step 244 the design-time engine 16 formulates a request for a change that is transmitted to the operating system 38. Such request, as before, will typically be in the form of a query string, such as for invoking scripting by reference to an ASP extension. At step 246, the requested change is transmitted to the run-time engine. At step 248, the request is made to the application 40. In response to the request, the application, which will have enumerated the instantiated device elements as before, executes a change to the corresponding property as indicated by reference numeral 250. The change in the property actually changes the configuration of the device element affected by the change. More than one such device element may be affected, such as both on-screen representations and device elements which are open in the global container but do not correspond to a representation on the viewable screen.

At step 252 the terminal display (i.e., the HMI display) is updated to reflect the change. It should be noted that updating of the display at step 252 effectively is performed by the run-time engine 14 and application working in parallel through the display manager and other components illustrated generally in FIG. 5 and discussed above. Thus, changes in the view on the device itself and as dynamic content in the design-time environment displayed in the browser of the configuration station are represented in parallel, without directly affecting the run-time utilization made by the operator. Again, such parallel building of the views is performed in quite different manners, that is, the updated display provided to the operator at step 252 is performed through the actual run-time engine 14, whereas in the steps to follow, representation of the change provided in the design-time environment is without direct reference to the actual functionality underlying operation of the design elements, but is merely a representation of images provided through the dynamic content.

At step 254, the updated property information is collected as in step 234 of FIG. 10 and dynamic content is built including representation of the change as indicated at step 256, which is generally identical to step 236 above with reference to FIG. 10. At step 258 the dynamic content is again posted as it was at step 238 in FIG. 10, and the dynamic content is again displayed at step 260. At this point the configuration of the device element is complete.

Exemplary Embodiments

Figure 12:
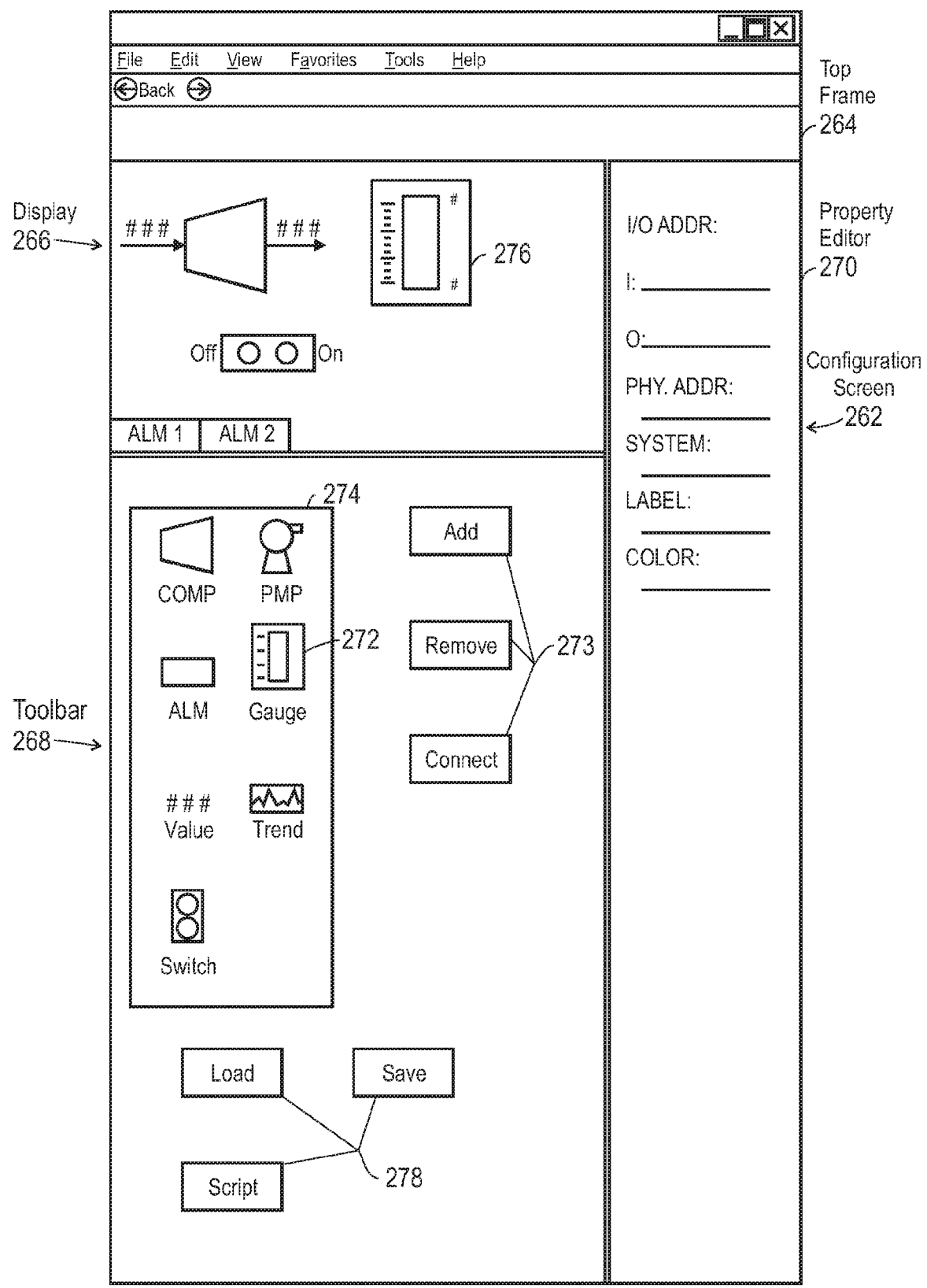
FIG. 12 is an exemplary illustration of a configuration screen as may be used to modify device elements or properties of device elements.

FIG. 12 is a representation of an exemplary configuration screen that is part of a remotely accessible design environment in accordance with embodiments of the present technique. Specifically, the illustrated embodiment represents a design environment, as viewed through a Web browser, including a frameset with four major sections. In one embodiment of the present technique, a frame appears in a Web browser as a scrollable window in which pages can be displayed.

The configuration screen may be generally referred to by reference numeral 262. As illustrated, the configuration screen 262 comprises exemplary sub-screens (i.e., frames) that allow configuration of a markup language page for utilization as an HMI graphical interface screen. Specifically, the configuration screen 262 includes the following frames: a top frame 264, a display frame 266, a toolbar frame 268, and a property frame 270. The top frame 264 is adapted to present a logo and/or banner that are editable by designated designers. The display frame 266 is adapted to facilitate management of selection, positioning, and sizing of device elements in a current view. The property frame 270 is adapted for editing properties of selected design elements, applications, and views. The toolbar frame 268 is adapted for selecting/adding/removing design elements and/or views, managing connections, loading/saving applications, invoking test scripts, and so forth. While other screens and sub-screens may be employed, the present representation illustrates only certain exemplary aspects in accordance with present techniques. It should be noted that these screens may be accessed in accordance with the present techniques from a remote configuration station using a standard Web browser.

It should be noted that although "frames" are illustrated and discussed herein for display of device element visual representations, and for display of device element properties, in practice any suitable display area, space or technique may be used for providing these to the designer or user. For example, as will be appreciated by those skilled in the art, "frames" are generally considered to be separate browsers or browser sections. Alternatively, the static and dynamic content may be provided in a single browser or browser segment. Moreover, such data and indicia may be included in separate browsers or screens, or in drop-down menus, or any other screen device.

The illustrated embodiment relates to accessing and displaying certain pages in each of the four major sections or frames. For example, in one embodiment of the present technique, a remote browser accesses an HMI and loads a default page having a ".htm" extension (e.g., default.htm) whereupon the browser is instantly re-routed to a default page having an "ASP" extension (e.g., defaultASP). The "ASP" extension instructs an HTTP server relating to the browser to load and process the page as ASP content as described above. The "ASP" file (e.g., default.asp) includes stored script, which relates to global functionality. In one embodiment of the present technique, the script creates a base for the device element corresponding to the access module 106 described above. The global functionality is adapted to be called by child pages that are loaded into a frameset, the frameset having been created by the "ASP" file. For example, a particular "ASP" file (e.g., default.asp) can be the parent frameset and can be accessed by a child frame. The display frame 266, the toolbar frame 268, and the property editor frame 270 are pages loaded into each separate frame.

In one embodiment of the present techniques and as described above, when the property frame 270 loads, the server software uses the access module 106 to query an active or selected device element (e.g., a selected virtual button) and then causes enumeration or properties of the active device elements. These active device elements can be applications, views, system elements, control elements, and so forth. In one embodiment, when the display frame 266 loads, it is loaded as ASP content and a script section of the display frame 266 queries the internal access module for current view information and instructs the view to draw images of all design elements of the current view and output them as JPEG files written to a virtual frame buffer or frame memory as described above. The display ASP then builds HTML tags linked to the JPEG files and adds positional data that is also queried from the control elements via the access module, also as described above. In one embodiment, the toolbar frame 268 uses the access module to manage its functionality.

The display 266 may include an HTML document creation screen that utilizes screen instructions and links to provide an operable HTML page. However, in some embodiments, the screen instructions are in a scripting language. The screen instructions may be programmed to facilitate navigation through various screens (e.g., HTML pages), programs, and functions corresponding to various different user inputs (e.g., input from a mouse). The links may reference and incorporate device elements adapted to facilitate interfacing of the HTML page with external input/output components. Indeed, a device element may be linked with an HTML page to facilitate an interface between an HMI and certain process components, where the HMI utilizes the HTML page as an operator interface screen. For example, in accordance with present techniques, by dragging-and-dropping a process device element icon (e.g., "gauge" icon 272) from a device element menu 274 in the toolbar frame 268 to the display frame 266, a device element may be incorporated graphically into display frame 266. Such a procedure may not only form a graphic 276 but it may also establish a specific design element for facilitating an interface between an HMI and a process. Further, the design element may facilitate configuration of its properties from a remote station via a browser (e.g., its representation, its function or "method", its state engine operability, its connections, and all such properties of lower levels of the device elements—which are themselves device elements). It should be noted that the toolbar frame 268 facilitates manipulation of the display frame 266 with various functions (e.g., functional buttons 278) in addition to the device element menu 274.

Once a graphic, such as graphic 276, is properly located on the page being developed, the property frame 270 may become available for configuration in accordance with the present techniques. The illustrated property editor frame 270 relates to the graphic 276 and other corresponding aspects of the related device element. Such sub-screens may enable a user to define certain properties of related device elements. Indeed, the property frame 270 may enable a user to associate a device element related to the property frame 270 (including the corresponding graphic 276) with an input/output address (e.g., an I/O address on a PLC). For example, a designer may associate a particular button with a register 32 on the control/monitoring device 30 illustrated by FIG. 2. Further, in accordance with present techniques, the property frame 270 may facilitate the incorporation of a tag or label (for identification of the device element), a physical address (for designating the location of related sensors and/or actuators), a dynamic visual component (e.g., logic to change graphic colors based on certain inputs), operational logic, and so forth. For example, a user may utilize the property frame 270 to link a device element including a representative graphic (e.g., a compressor graphic) to an I/O address in a PLC communicating with a status sensor. For example, if the equipment is running, the graphic may be green. Alternatively, if the equipment is down, the graphic may be red. Additionally, logic (i.e., a "method" or function of the state engine, or a connection) in the related device element may send data to an I/O address on a PLC that is connected to an actuator, requesting that the actuator be energized based on the status of the equipment or other feedback.

It should be noted that an extremely useful aspect of both the design-time environment and the run-time environment is that the static content may be adapted to provide a desired "look and feel" to one or all of the screen views. For example, a supplier, reseller or original equipment manufacturer may desire to acquire an interface device from a common manufacturer along with the basic configuration software, run-time engine, design-time engine, and so forth. The device elements themselves may be configured to suit the designer or original equipment manufacturer. Similarly, the static content may be "relegendable" so as to permit the overall look or certain aspects of the look of the interface to be changed as an indication of the preferences of the manufacturer. Such features may include color schemes, banners, and so forth, including indicia or logos of the manufacturer. The relegendable content may be simply stored on the interface device as bitmap files, JPEG images, HTML stylesheets, and so forth. When a change in the relegendable static content is desired, then, the file from which such content is drawn may be simply replaced. The dynamic content is then displayed in or adjacent to the relegendable content, providing a platform for marketing or designation of a source of origin.

Figure 13:
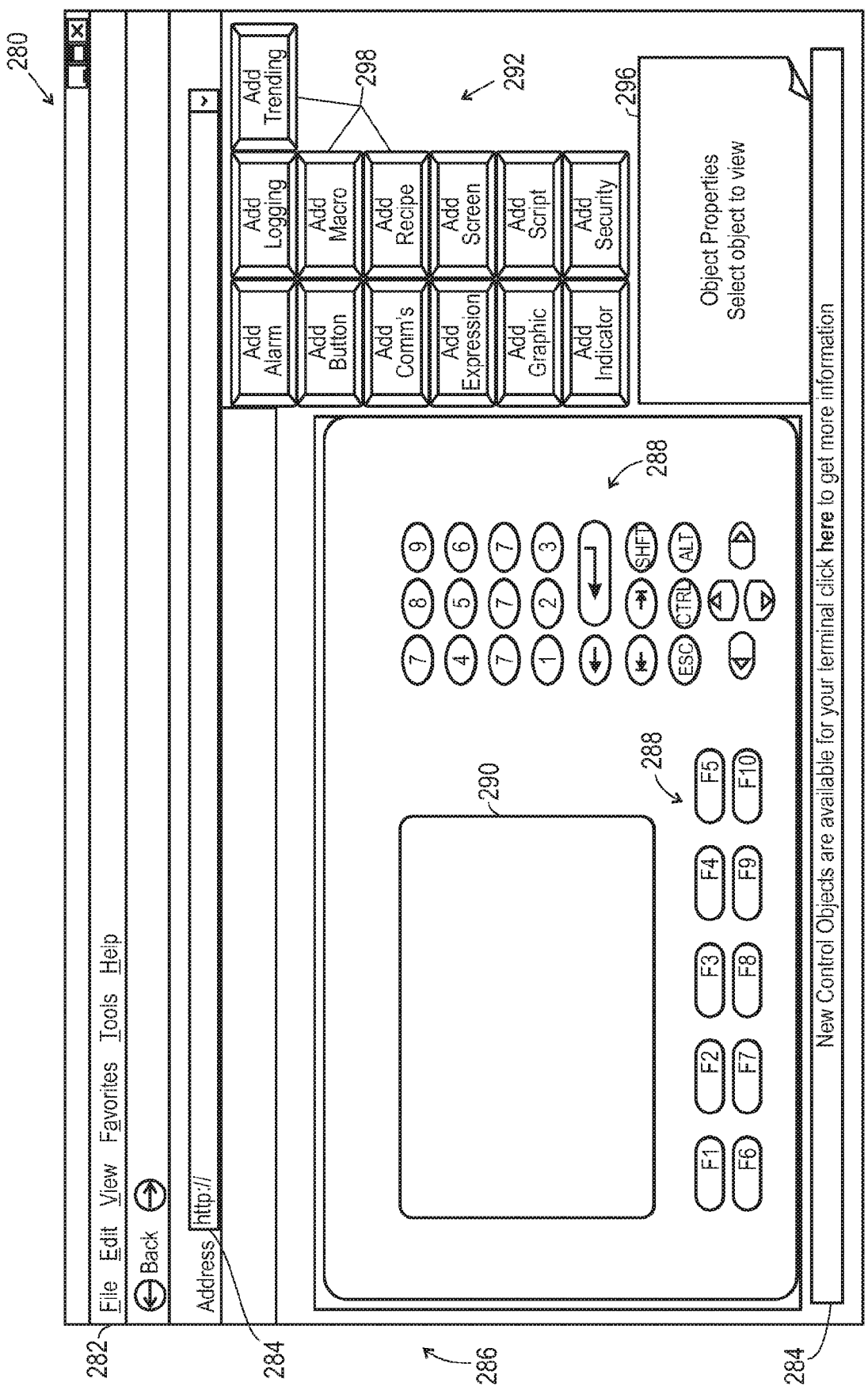
FIG. 13 is an exemplary screen view for configuration of an interface, either for use on an actual interface through information derived from the interface or in an emulation of the interface.

FIG. 13 is another exemplary representation of a configuration screen in accordance with present embodiments. Again, it should be noted that this screen may be remotely accessed. Specifically, FIG. 13 illustrates a browser development view 280 that may be accessed through a browser 282 from a remote station. Indeed, in accordance with present embodiments, this development view 280 may be accessed much like any other web page, from a computer that is linked (e.g., via the Internet) to an HMI. For example, a user having appropriate access status may simply type an address into an address window 284 of the browser 282 and gain access to configuration of the HMI via the development view 280.

It should be noted that the illustrated embodiment of the browser development view 280 includes a development environment 286 that is representative of a physical HMI panel, including buttons 288 and a work screen 290. Indeed, to facilitate operational familiarity, the development environment 286 may include graphics and software functions that emulate configuration directly on the physical HMI. For example, a user may be able to virtually push the buttons 288 and manipulate the work screen 290 in a fashion similar to configuring the HMI directly. Accordingly, an operator that is accustomed to programming an HMI directly on the HMI in the field, may immediately be familiar with the browser development environment 286 because the appearance and functionality mimic an actual HMI.

In addition to the representation of the actual HMI, the development environment 286 may comprise an object assembly tool 292, an update notice banner 294, and an object properties view 296. The assembly tool 292 may comprise virtual buttons 298 that are adapted to implement or insert certain device elements and functions into HMI screens. For example, the push buttons 298 may add alarms, trending, graphics, macros, and so forth to a particular HMI screen. The update notice banner 294 may indicate to a user that certain upgrades are available for download to the HMI. For example, a message on the update notice banner 294 may indicate that new device elements for an object library residing on the HMI are available from a particular website. In some embodiments, the banner may automatically connect a user to the particular website when the banner 294 is selected (e.g., clicked on with a pointer). The device properties view 296 may indicate certain properties of a device element that is selected from the work screen 290. For example, a graphic device representing a pump may be selected on the work screen 290 and properties related to the device such as a tag, a register, a physical address, operational logic, and so forth may then be illustrated in the properties view 296. Other screens and sub-screens may be employed, and the present representation illustrates only certain exemplary aspects in accordance with present techniques.

Figure 14:
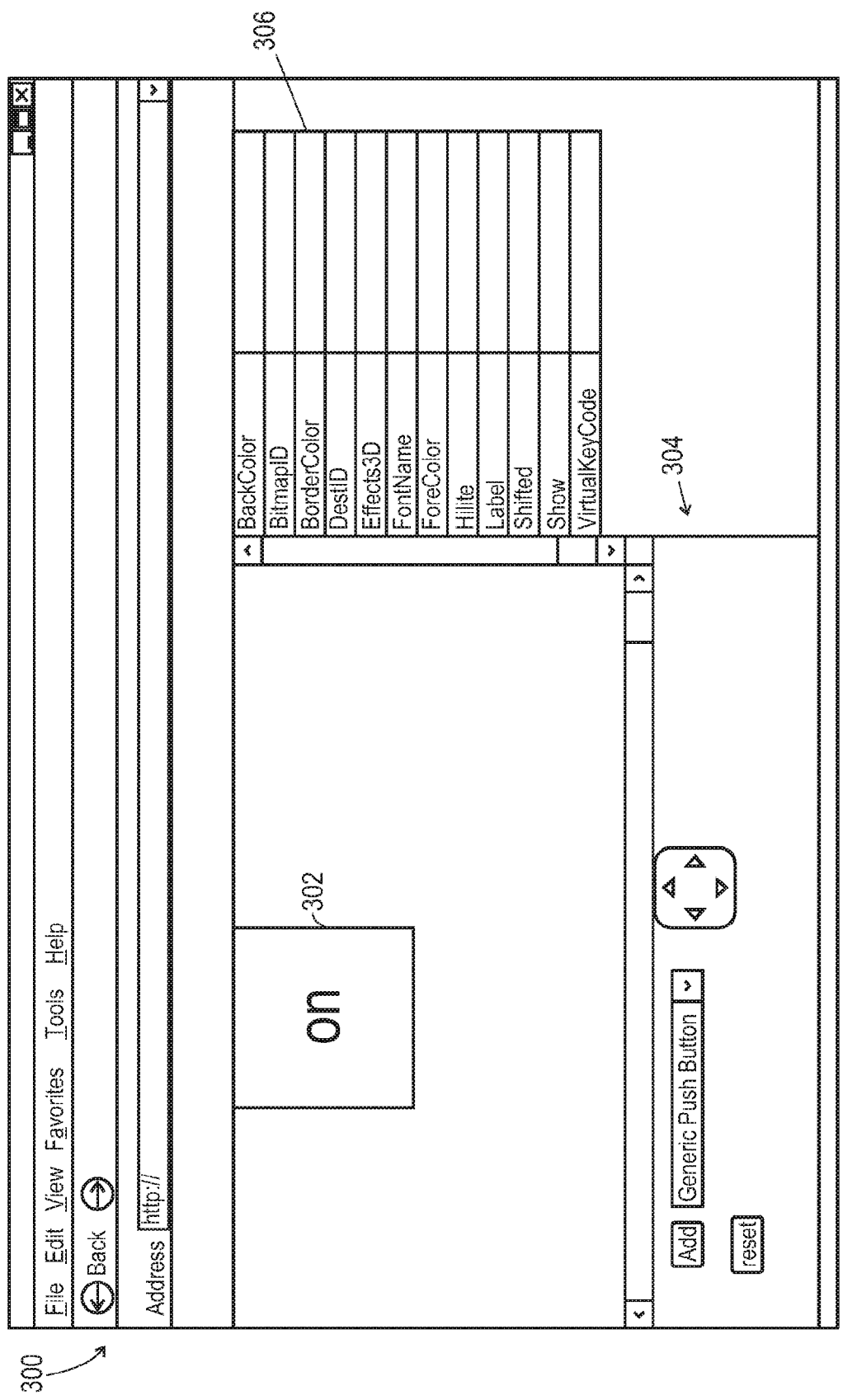
FIG. 14 is a further view of an exemplary configuration page for setting characteristics of device elements.

FIG. 14 is an exemplary representation of a device element configuration screen in accordance with present embodiments. The device element configuration screen may be generally referred to as screen 300. Specifically, the screen 300 may be a screen that is accessible from a development environment (e.g., 262, 286) and that facilitates direct configuration of device elements and graphics through a browser. For example, a user may select a push button 298 in the development environment 286 that adds an on/off button 302 to an HMI graphic. Upon adding the on/off button 302, sub-screen 304 may be accessed and displayed on the browser 282 to facilitate configuration of aspects of the on/off button. For example, visual properties (e.g., color and font) and dynamic links (e.g., associated I/O address) of the on/off button 302 may be edited in sub-screen 304. Further, tools available in a sub-screen 306 may be utilized to manipulate the on/off button graphic and/or add additional graphics and modules from a library, as described above. It should be noted that configuration of a device element relating to the on/off button through the browser is a direct configuration of that element on the HMI in accordance with present techniques.

Figure 15:
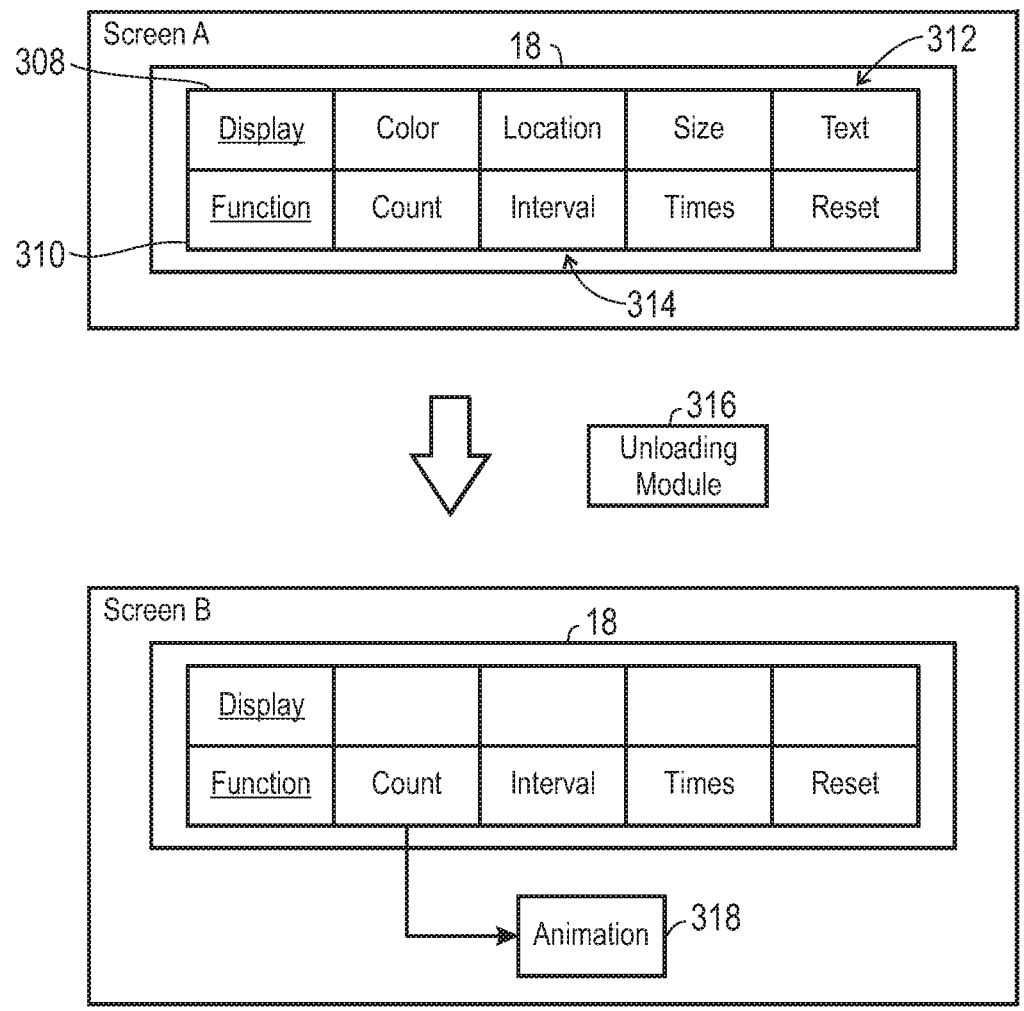
FIG. 15 is a general overview of how various screens may be programmed for carrying out functions in accordance with aspects of the present technique.

As discussed above, in accordance with one aspect of the present technique, a global container is created that includes instances of all needed device elements (both with and without screen representations). This greatly enhances the speed of updating screens and switching between screens. At the same time, to reduce memory and processing requirements, elements not required for a current screen are "torn off." FIG. 15 is a flow diagram representing "tear off" functionality in accordance with embodiments of the present techniques. Specifically, FIG. 15 illustrates transitioning between a first screen (i.e., screen A) and a second screen (i.e., screen B), wherein a component of a device element is collapsed in the transition. In one embodiment, the collapsing is facilitated by an unloading module 316, which removes certain aspects of the device element from memory (e.g., RAM), while maintaining the element instantiated and active.

Because of the quantity of device elements that can be associated with a particular control and monitoring system, memory usage can become an issue. Indeed, excessive memory usage can impact performance of a system by, for example, reducing display performance (e.g., cause a lengthy response time). Accordingly, embodiments of the present invention incorporate tear off functionality. In other words, components not active in a current screen view can be collapsed to save space. This collapsing of components is achieved by unloading unnecessary information. For example, in one embodiment, only basic characteristics of a component are maintained in memory, while specific characteristics are unloaded. Tear off functionality may include the ability to have an object that provides less than a full description of itself using a common portion of memory.

In a specific example, illustrated by FIG. 15, the device element 18 is representative of a software clock that is collapsed in transition from screen A to screen B. In screen A, the clock includes a graphical representation of a functional clock. For example, it can include a functional digital representation of a current time (e.g., 2:18 PM) that continually updates as its functionality follows an internal HMI clock. In screen B, the clock is merely functional and is utilized to update an animation graphic 318 on a designated interval. For example, components of the animation graphic 318 may move every few seconds based on the timing of the functional clock 318. The graphic of the clock itself is not illustrated in screen B. Thus, the components relating to the graphic representation of the clock 318 are no longer being utilized in screen B.

The device element 18 includes two basic property labels, which include a display property label 308 and a function property label 310. The display property label 308 relates to determining how the clock is graphically represented and the function property label 310 relates to determining how the clock operates (e.g., measures time). Each of these property labels references associated properties, which may include dynamic property values. The display property label 308 is associated with properties including color, location, size, and text, which are generally referred to as display properties 312. The function property label 310 is associated with properties including count, interval, time, and reset, which are generally referred to as function properties 314.

As discussed above, the display properties 312 are no longer utilized in screen B. However, the function properties 314 are utilized in screen B to manipulate the animation 318. Accordingly, in the illustrated embodiment, the display properties 312 are in a collapsed condition when a user is viewing screen B. Indeed, in the illustrated embodiment, the display property label 308 remains without its associated display properties 312 in order to provide a limited description of the property. This improves display performance by reducing memory usage.

As also described above, connections can be established between device elements so as to cause immediate transmission of certain input data from a first device element to another upon its receipt. This highly powerful feature allows different device elements to share data and act upon the data separately. That is, each device element acts in accordance with its own "methods" or state engine. In a special, but particularly useful case, two identical device elements (e.g., at different locations on a network or in different devices) can "mirror" their operation by virtue of such event-driven data transmission (the "event" being the receipt of the data).

Figure 16:
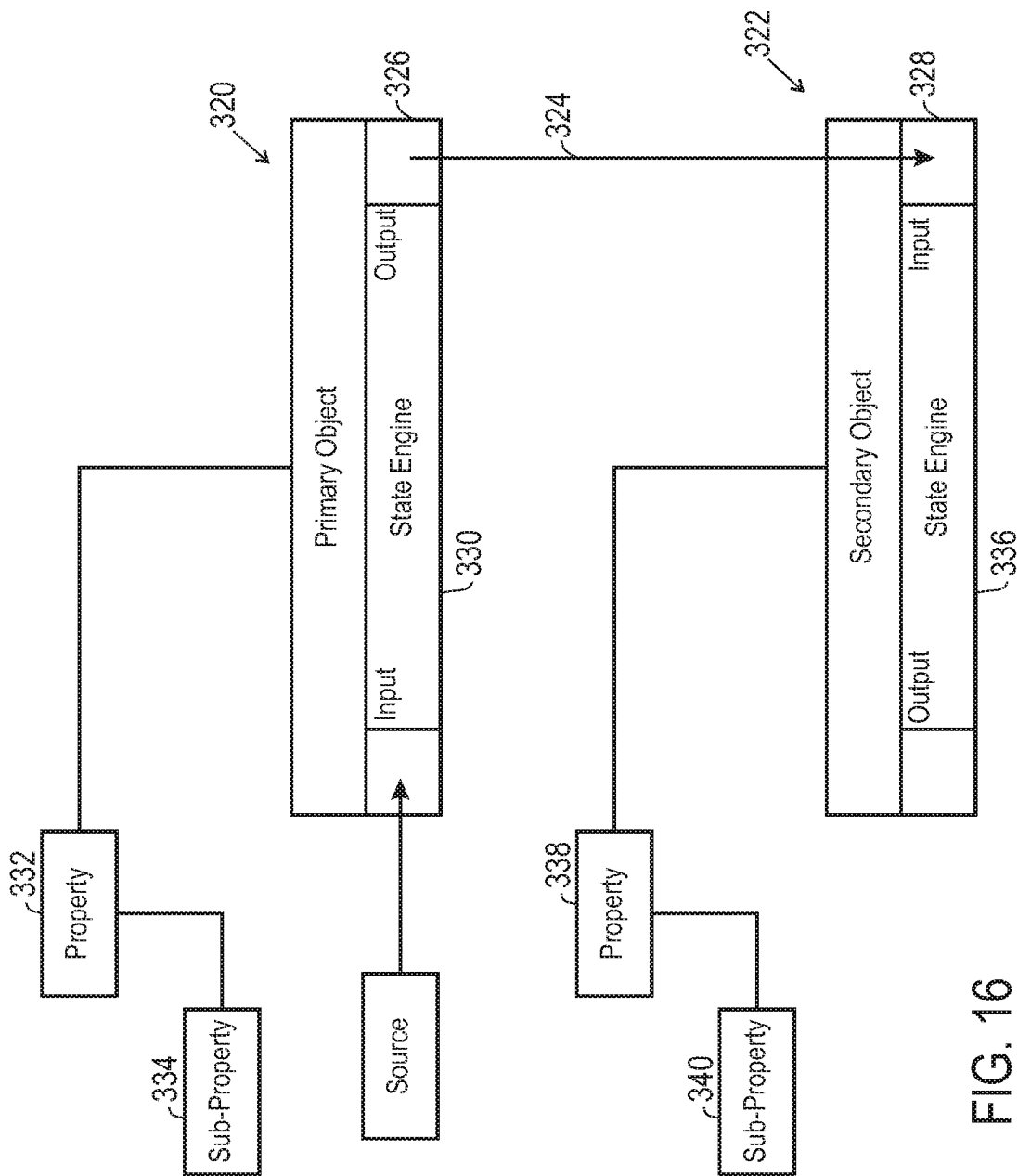
FIG. 16 is a general overview of manners in which information may be directly shared between device elements, such as through connections.

FIG. 16 illustrates device element mirroring in accordance with such programming. Device element mirroring is also yet another technique for conserving memory. As discussed above, because of the quantity of device elements that can be associated with a particular control and monitoring system, memory usage can become an issue. Indeed, excessive memory usage can impact performance of a system by, for example, reducing display performance (e.g., cause a lengthy response time). Sharing properties between device elements can result in redundancies that cause inefficiency and delay on an HMI. For example, excessive memory may be allocated to track or control a single measured value, which results in wasted memory. Similarly, excessive network traffic may result from redundant information being transmitted, resulting in wasted network resources. Accordingly, embodiments of the present techniques incorporate device element mirroring.

Specifically, FIG. 16 illustrates a flow diagram that is representative of two device elements sharing a particular property (e.g., a display property). The primary object is generally referred to as first element 320 and the secondary object is generally referred to as second element 322. The second element 322 mirrors the first element 320 via a connection 324. The connection 324 is between an output 326 of the first element 320 and an input 328 of the second element 322 and is triggered by the event of receiving data from a source. That is, in one embodiment of the present techniques, an event of receiving data by the first element 320 triggers transmission of data to the second element 322 via the connection 324.

In a specific example, as illustrated by FIG. 16, the first element 320 is a device element relating to a first virtual gauge on a first HMI and the second element 322 is a device element relating to a second virtual gauge on a second HMI. The first element 320 has a first state engine 330 and a first property 332 (e.g., color). The second element 322 has a second state engine 336 and a second property 388 (e.g., color). It should be noted that in other embodiments, the elements are not the same type of element (i.e., both gauges). Indeed, in some embodiments the elements merely have similar functionality. Further, in some embodiments, even the properties are of different types.

In the illustrated embodiment, the first element 320 directly communicates with an event source. For example, if an emergency valve in a gas plant opens, the first 320 may detect a discrete event from the event source, such as a PLC. Based on the detected event, the first element 320 may signal a related graphic property (e.g., 332) or a sub-property (e.g., 334) to change colors (e.g., change from green to red). Further, based on the connection 324, the second element 322 will mirror the first element 320 by changing the color of its related property 338 or sub-property 340.

The two elements (320 and 322) are connected via the connection 324 thus facilitating communication between the first state engine 330 and the second state engine 336. Accordingly, when the first property 332 changes (e.g., changes from green to red), the first state engine 330 communicates the change to the input 328 relating to the second state engine 330 via the output 326. This component mirroring allows two or more device elements (e.g., 320 and 322) to react in the same or similar fashion without consuming additional resources.

Figure 17:
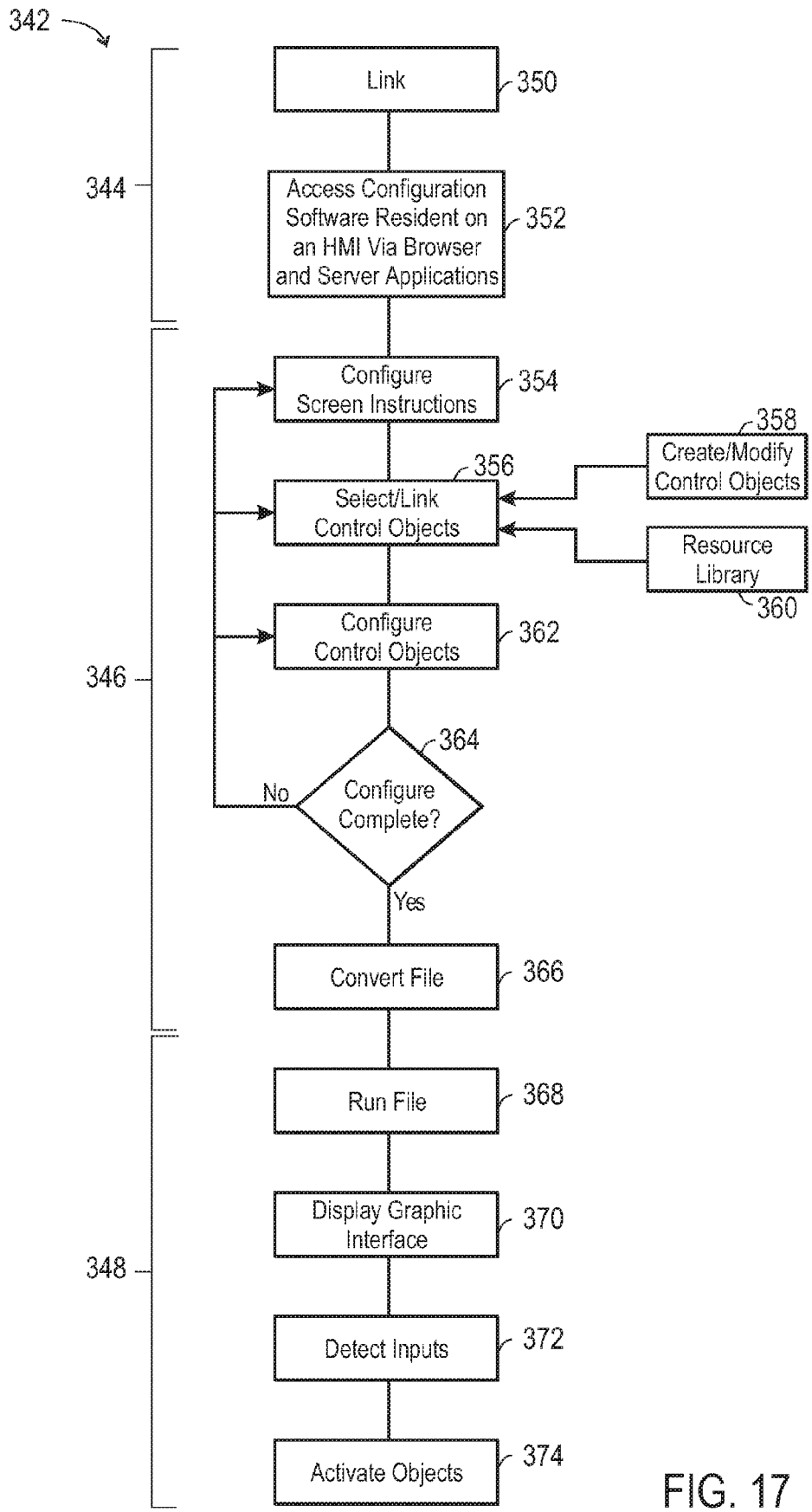
FIG. 17 is a flow chart illustrating exemplary steps in configuring an interface and its device elements in accordance with aspects of the present technique.

FIG. 17 is a block diagram summarizing a method described above for remotely configuring and implementing an application (e.g., graphical interface) using a standard interface in accordance with specific embodiments of the present techniques. The method may be generally referred to by reference numeral 342. Specifically, the method 342 may incorporate various procedures relating to different phases of operation. While FIG. 17 separately delineates specific procedures, in other embodiments, individual procedures may be split into multiple procedures or combined into a single procedure. In particular, the method 342 comprises a connection phase 344, a configuration phase 346, and an operation phase 348.

The connection phase 344, in accordance with the present techniques, includes linking an HMI to a configuration station (block 350) and accessing device elements and/or configuration software (block 352) that are resident on the HMI via server and browser applications. Once access is established, the device elements and the configuration application may be utilized in the configuration phase 346 to develop interface screens for the HMI, via the configuration station. It should be noted that linking the HMI and configuration station (block 350) may comprise the utilization of a network interface, direct connect cable or any other suitable connection, as discussed previously. Alternatively, if remote access is not desired, a browser program on the HMI itself may be used to access the device elements and configuration application on the HMI without establishing a link to a remote device.

Once access to the configuration application is established, assembly of a screen, which may take the form of a markup page, may begin in the configuration phase 346. The configuration phase may comprise configuring screen instructions (block 354) for the screen and selecting/linking device elements (block 356). Specifically, block 354 may represent writing background instructions for coordinating aspects of a typical input device with the markup page and for other related functions. For example, the screen instructions may coordinate certain keyboard inputs with particular software functions (e.g., opening a software application when a particular button or virtual button is pushed). The screen may be further configured by selecting/linking device elements (block 356) to aspects of the screen, thus incorporating the device elements as functional elements. This selecting/linking procedure (block 356) may include the creation/modification of device elements (block 358), and more particularly, of their properties, and the importation of device elements from a resource library (block 360). For example, as discussed previously, a new device element may be added to the HMI by retrieving it through the internet and downloading it to the HMI. Additionally, the configuration tool on the HMI may allow a user to modify existing device elements and implement the modified versions in an operation environment.

In accordance with embodiments of the present techniques, the device elements being selected and linked in block 356 may require configuration. Such a procedure is illustrated by block 362, which may represent defining certain properties in device elements that enable the device elements to interface with external process components (e.g., I/O addresses on a PLC). It should be noted that this configuration procedure (block 362) may be integral to the development of screens or may occur in a separate procedure. For example, each time a device element is linked to screens, it may require configuration. Alternatively, a device element may be linked and configured at any time.

Block 364 represents a decision block. If the configuration is complete, the method may proceed to block 366. Alternatively, configuration may continue as illustrated. The result of the configuration phase in accordance with embodiments of the present technique may be the creation of a display file, as illustrated by block 366. After being developed, this resulting display file may be implemented as an operational graphical interface (block 368) and utilized in the operation phase 348.

The operation phase 348 may comprise the actual implementation of the configured screen as a graphical interface on an HMI. Specifically, the procedures for such an implementation may include running the display file (block 368) created in block 366. This may result in the display of the graphical interface on a user-viewable screen of the HMI or on a screen linked to the HMI through server and browser applications, as illustrated by block 370. Further, running the display file (block 368) may enable the detection of system and user inputs (block 372) in addition to activating the device elements (block 374). Indeed, an HMI may comprise embedded code and a server that enable a standard internet browser to navigate and implement a number of such graphical displays and related device elements. Thus, embodiments of the present techniques may interact with a process to form a control and monitoring system using a standard web interface (e.g., HTML page).

Figure 18:
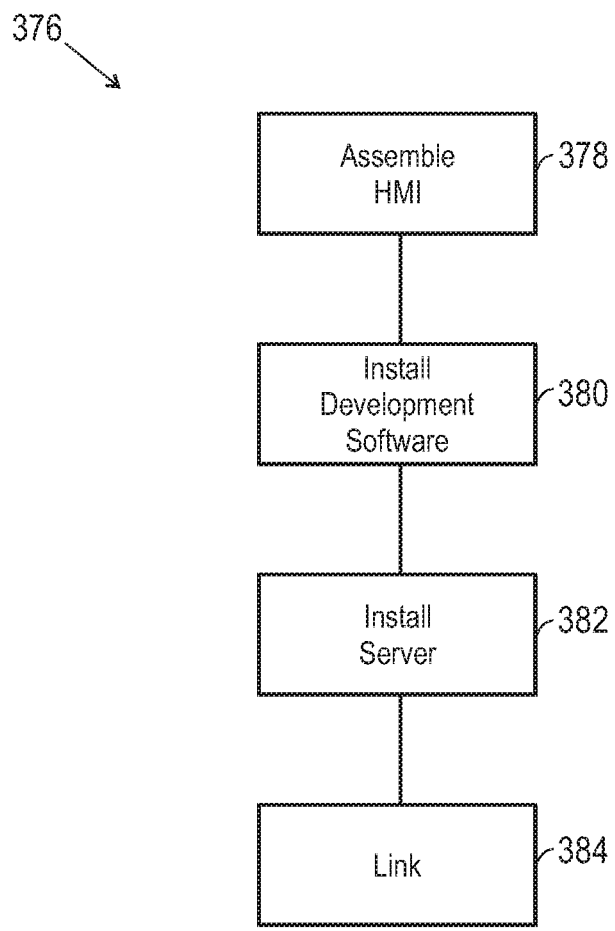
FIG. 18 is a flow chart illustrating exemplary steps in setup and programming of such an interface.

FIG. 18 is a block diagram illustrating a method for assembling and implementing an HMI adapted for remote configuration using a standard interface in accordance with embodiments of the present techniques. The method may be generally referred to by reference numeral 376 and the standard interface may comprise a browser. Method 376 may comprise assembling an HMI (block 378), installing a development package (e.g., device elements) on the HMI (block 380), installing server software (e.g., a Web server) on the HMI (block 382), and linking the HMI to a remote computer (block 384). Once the link is established between the HMI and remote computer, a user may remotely configure the HMI using images (e.g., JPEG) of elements that are served up to the remote computer. As discussed above, the remote computer may have browser software that is adapted to access the development package on the HMI via the server. Further, as discussed above, the access may be limited by security measures (e.g., passwords and user status). It should be noted, here again, that configuration need not be done directly on the HMI. Indeed, a virtual HMI may be established for configuration in accordance with embodiments of the present techniques. For example, a user may configure a virtual HMI without having a physical HMI present. Once configured, the application created on the virtual HMI may be transferred to an actual HMI.

Figure 19:
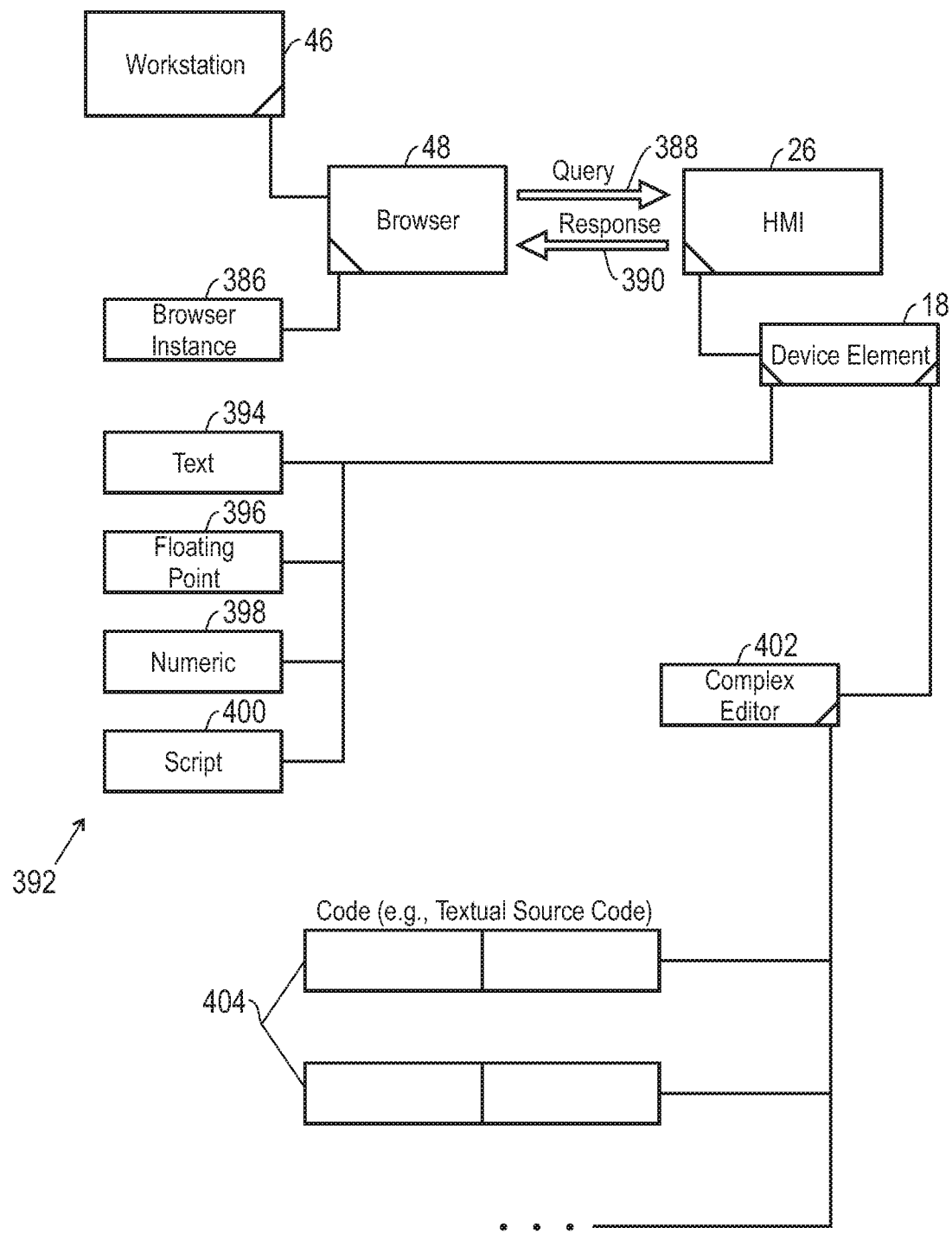
FIG. 19 is a block diagram illustrating an exemplary manner in which various types of code may be modified as device elements, thereby facilitating virtual universal configuration of device elements in accordance with aspects of the present technique.

FIG. 19 is a flow diagram illustrating a manner in which the present techniques may support universal web-based programming and configuration via device-side scripting. Specifically, FIG. 19 illustrates interactions between a workstation 46 and an HMI 26. The interactions are conducted through a browser 48 resident on the workstation 46. In the illustrated embodiment, the browser 48 sends queries 388 to the HMI 26 and receiving responses 390 therefrom. The queries may relate to various activities, requests, and commands. For example, in one embodiment a query is submitted to determine a property type for a configurable device element 18 resident on the HMI. The device element may include various properties. For example, in the illustrated embodiment, the element 18 has various property types, including a text type 394, a floating point type 396, and numeric type 398. These property types are designated generally by reference number 392. Additionally, the element 18 may include an interface property type that is designated 400.

The interface property type 400 is adapted to respond to a query by indicating that an interface type (e.g., IDispatch) is available. Further, the type 400 may respond to a separate query regarding interface type with a specific type of interface script (e.g., storage interface script). Indeed, the type 400 is adapted to enable an interface that provides editing capabilities by, for example, by creating a separate instance 386 of the browser with a window to facilitate editing. This separate instance 386 is instantiated in a JavaScript in accordance with embodiments of the present techniques.

In one embodiment of the present technique, the HMI 26 responds to a query regarding property type for the configurable element 18 with a complex editor 402 having a storage interface that mimics a programming language. The editor, which may be a simple text editor, is adapted to permit code stored in the interface type property to be edited. This approach thus permits even extremely extensive code (e.g., source code) to be stored in a device element and accessed in exactly the same way as described above for editing. Separate storage and loading of the code, compilation of the code, and use of specially designed programming tools are thus avoided.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An industrial automation component comprising:
   a plurality of software objects defined by object-oriented programming, each object having properties including a visual representation and a functionality;
   a server module configured to serve a user viewable screen from the industrial automation component to a device to enable viewing;
   an access module configured to prompt the software objects to send an image defining its visual representation to a memory display context to enable inclusion in the user viewable screen without reference to the respective functionality of the respective software object, wherein the access module is configured to prompt collection of property data from the software objects defining aspects of the respective visual representation; and
   a processor configured to execute the server module and the access module.

2. The industrial automation component of claim 1, wherein the industrial automation component comprises a human machine interface.

3. The industrial automation component of claim 1, wherein the access module comprises a software object.

4. The industrial automation component of claim 3, wherein the access module is stored and executed on the industrial automation component.

5. The industrial automation component of claim 1, wherein the server module includes an HTTP server resident on the industrial automation component.

6. The industrial automation component of claim 1, wherein the images are JPEG images.

7. The industrial automation component of claim 1, wherein the images sent to the memory display context are converted to HTML tags to enable inclusion in the user viewable screen.

8. The industrial automation component of claim 1, wherein the images are converted to dynamic content served by the server module as a dynamic HTML page.

9. The industrial automation component of claim 1, wherein the property data is converted to a property frame to be displayed as dynamic content by the server module in the user viewable screen.

10. The industrial automation component of claim 1, wherein the query is interpreted by server-side scripting that initiates generation of the user viewable screen.

11. An industrial automation component comprising:
    a plurality of software objects defined by object-oriented programming, each object having properties including a visual representation and a functionality;
    an access module configured to prompt the software objects to send an image defining its visual representation to a memory display context to enable inclusion in the user viewable screen without reference to the respective functionality of the respective software object, wherein the access module is configured to prompt collection of property data from the software objects defining aspects of the respective visual representation; and
    a design-time environment including a static content frame and a dynamic content frame, the dynamic content frame including the software object images;
    a server module configured to send the design-time environment from the industrial automation component to a device to enable viewing; and
    a processor configured to execute the access module and the server module.

12. The industrial automation component of claim 11, wherein the industrial automation component comprises a human machine interface.

13. The industrial automation component of claim 11, wherein the access module comprises a software object.

14. The industrial automation component of claim 11, wherein the dynamic content is built in response to receipt of a query from the device.

15. The industrial automation component of claim 14, wherein the query is interpreted by server-side scripting that initiates generation of the dynamic content.

16. The industrial automation component of claim 11, wherein the property data is converted to a property frame to be displayed as dynamic content.

17. The industrial automation component of claim 11, wherein the images sent to the memory display context are converted to HTML tags to enable inclusion in the design-time environment.

18. The industrial automation component of claim 11, wherein the images are converted to dynamic content served by the server module as a dynamic HTML page.

19. A method for providing a user viewable screen comprising:
   accessing a plurality of software objects on an industrial automation component, each software object having properties including a visual representation and a functionality, the software objects being accessed by an access module that prompts each software object to send an image defining its visual representation to a memory display context to enable inclusion in the user viewable screen without reference to the respective functionality of the respective software object, wherein the access module is configured to prompt collection of property data from the software objects defining aspects of the respective visual representation; and
   serving the user viewable screen including the visual representations from the industrial automation component to a device to enable viewing.

20. The method of claim 19, comprising interpreting a query from the device by server-side scripting that initiates generation of the second user viewable screen.

21. The method of claim 19, comprising converting the images sent to the memory display context to HTML tags to enable inclusion in the user viewable screen.

22. The method of claim 19, comprising converting the images to dynamic content served by the server module as a dynamic HTML page.

23. The method of claim 19, comprising converting the property data to a property frame to be displayed as dynamic content by the server module in the user viewable screen.

24. A configurable human machine interface system comprising:
   a tangible, non-transitory machine readable medium, and
   programming code stored on the tangible, non-transitory machine readable medium defining instructions to:
   access a plurality of device elements, each device element having properties including a visual representation and a state engine defining functionality of the respective device element, wherein each of the device elements comprises a software object, the device elements being accessed and prompted by an access module configured to prompt collection of property data from each device element defining aspects of the respective visual representation and to send an image defining its visual representation to a memory display context to enable inclusion in the user viewable screen without reference to the respective functionality of the respective device element; and
   serve the user viewable screen including the visual representations from the configurable interface device to a configuration station to enable viewing in a general purpose viewer via a server module in response to receipt of a query requesting the user viewable screen.

* * * * *